(12) United States Patent
Michael

(10) Patent No.: US 6,546,315 B1
(45) Date of Patent: Apr. 8, 2003

(54) PROGRAMMABLE MATERIALS

(76) Inventor: Joseph Michael, 23 Portland Rise, London (GB), N4 2PT ( * ) Notice: Subject to any disclaimer, the term of this patent is extended or adjusted under 35 U.S.C. 154(b) by 151 days.

(21) Appl. No.: 09/685,176

(22) Filed: Oct. 10, 2000

Related U.S. Application Data

(63) Continuation of application No. 08/727,557, filed as application No. PCT/GB95/00460 on Mar. 3, 1995, now Pat. No. 6,157,872.

(30) Foreign Application Priority Data

Mar. 4, 1994 (GB) .............................................. 9404227

(51) Int. Cl.$^7$ ............................................. G05B 19/04
(52) U.S. Cl. ......................... 700/247; 700/248; 901/6; 180/8.6
(58) Field of Search ................................ 700/247, 248, 700/249; 901/1, 6; 180/8.5, 8.6

(56) References Cited

U.S. PATENT DOCUMENTS

| | | | | |
|---|---|---|---|---|
| 4,541,062 A | * | 9/1985 | Kada et al. | 219/124.34 |
| 4,608,525 A | * | 8/1986 | Mori et al. | 700/248 |
| 4,664,590 A | * | 5/1987 | Maekawa | 104/89 |
| 4,689,755 A | * | 8/1987 | Buote | 700/247 |
| 4,730,258 A | * | 3/1988 | Takeda et al. | 318/568.11 |
| 4,835,711 A | * | 5/1989 | Hutchins et al. | 700/247 |
| 4,940,925 A | * | 7/1990 | Wand et al. | 318/580 |
| 5,081,593 A | * | 1/1992 | Pollack | 318/568.16 |
| 5,210,821 A | * | 5/1993 | Yazaki et al. | 700/248 |

* cited by examiner

Primary Examiner—Leo Picard
Assistant Examiner—Michael D. Masinick
(74) Attorney, Agent, or Firm—Pitney, Hardin, Kipp & Szuch LLP

(57) ABSTRACT

Programmable material is a collection of substantially cubic shaped bricks called monomers that move relative to each other under computer control to sculpt engineering structures (5) and mechanisms (6) (walking machine) illustrated in the figure. The monomers have features to lock to other monomers and slide relative to other monomers without separating. The monomers are fault tolerant against damage; functional monomers move faulty monomers and replace them with functioning clones. Movement of monomers is broken down systematically into streamers, gateways, highways and reservoir methods to obtain individual monomer movement paths required to synthesise a structure. Specialised monomers can carry tools which together with synthesis of custom structures create custom machines.

10 Claims, 22 Drawing Sheets

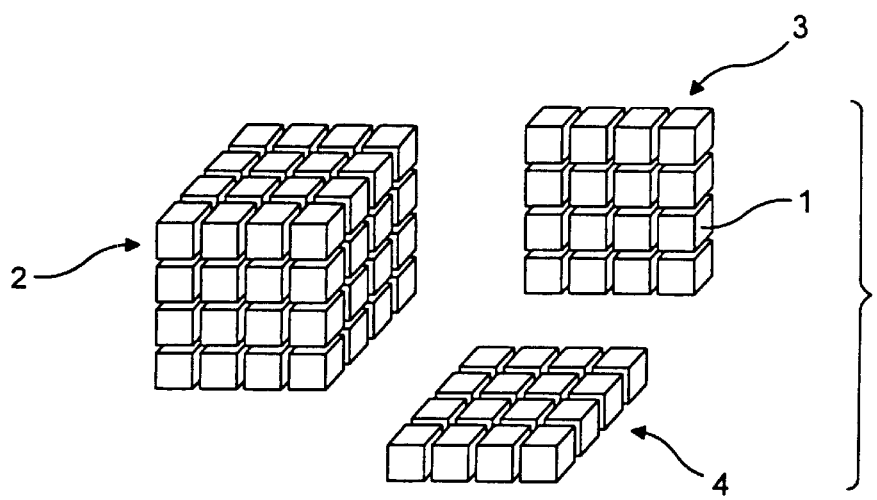
F I G. 1
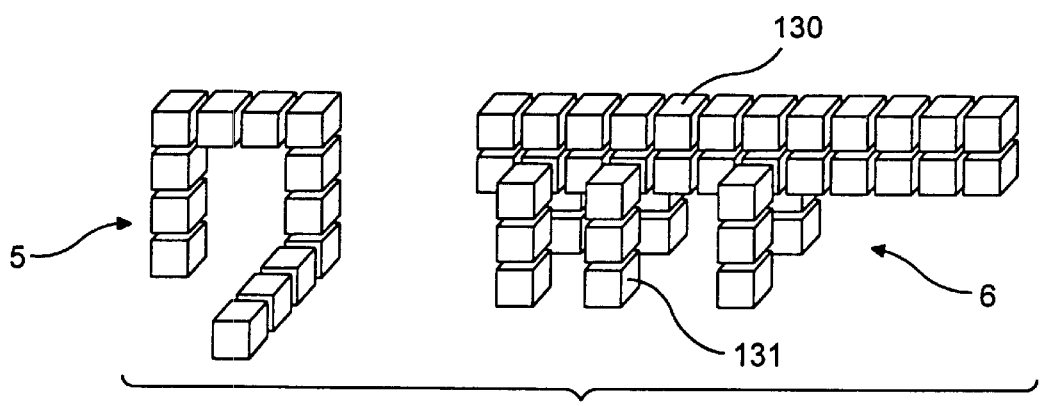
F I G. 2
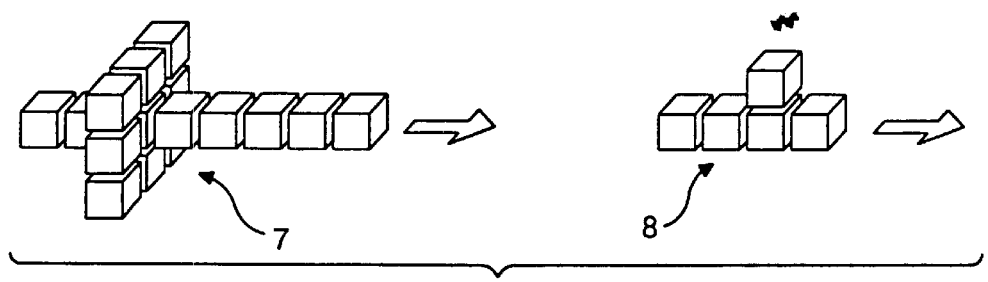
F I G. 3

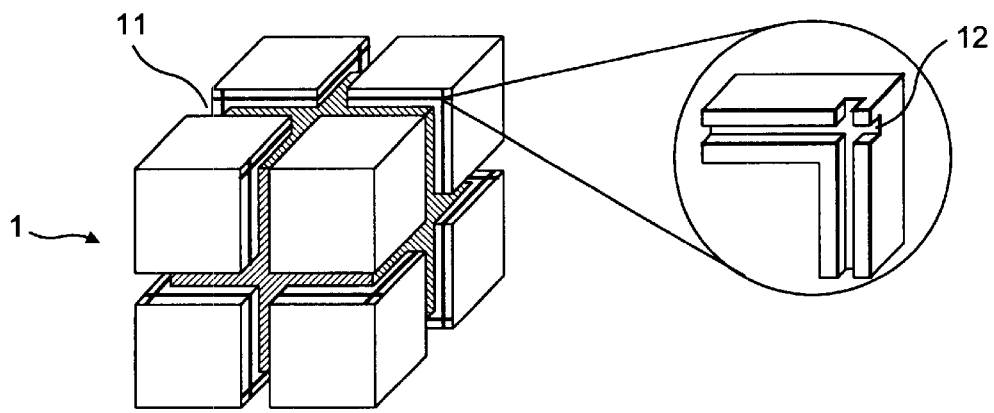
F I G. 4
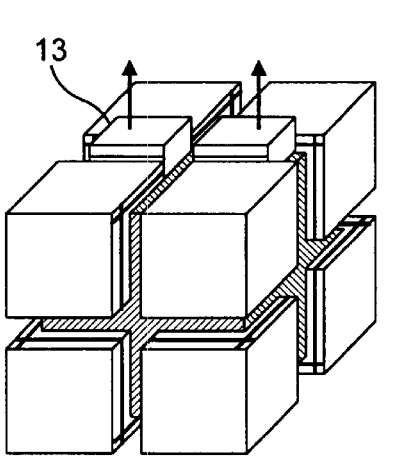
F I G. 5a
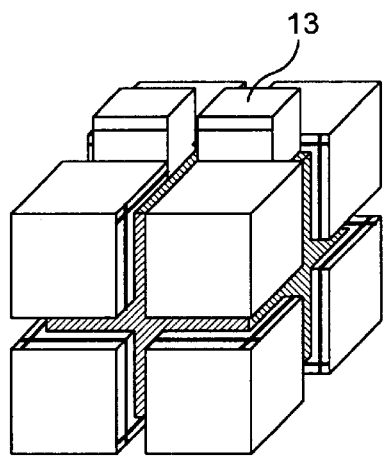
F I G. 5b
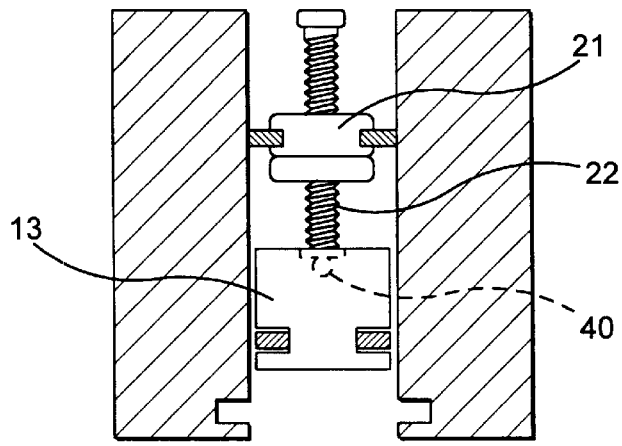
F I G. 6

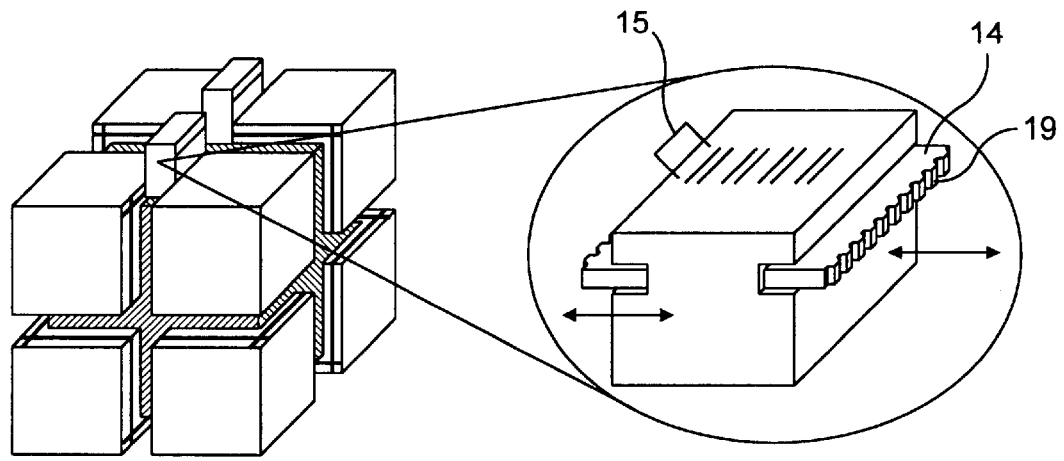
F I G. 7
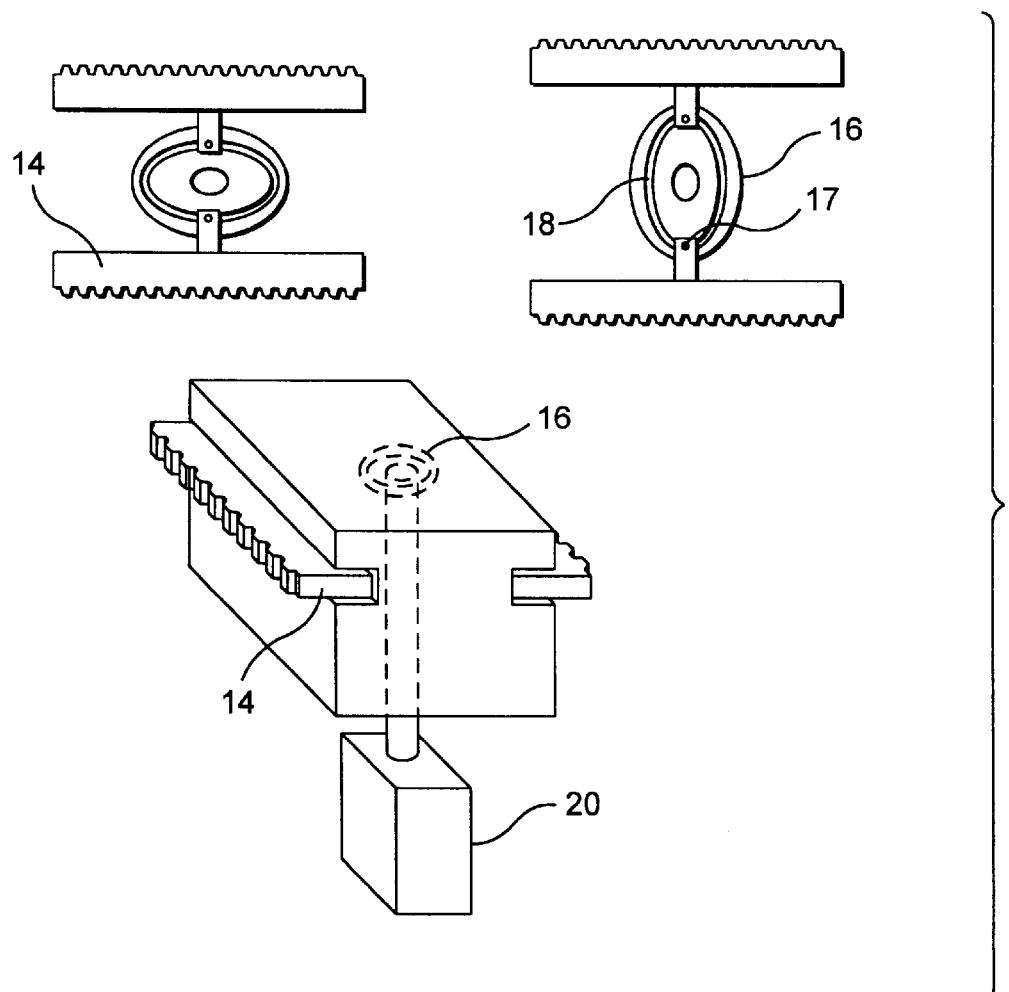
F I G. 8

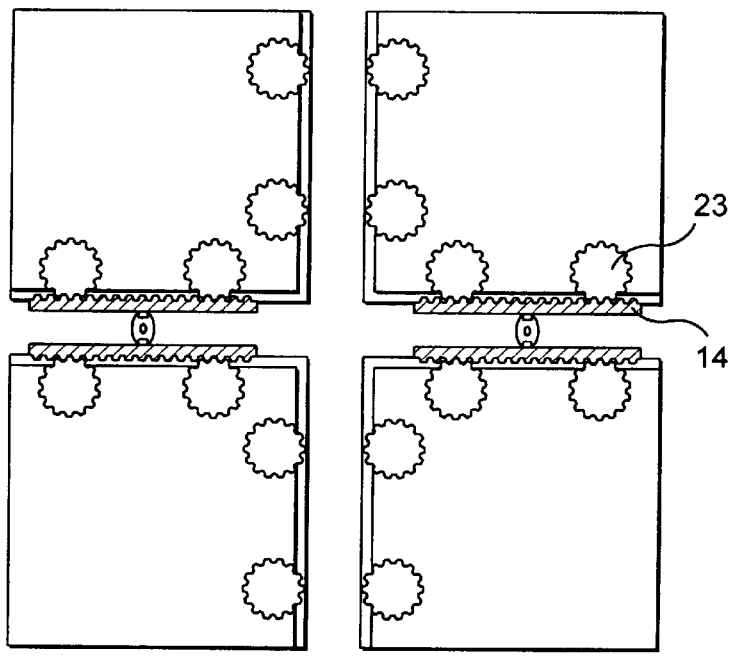
F I G. 11a
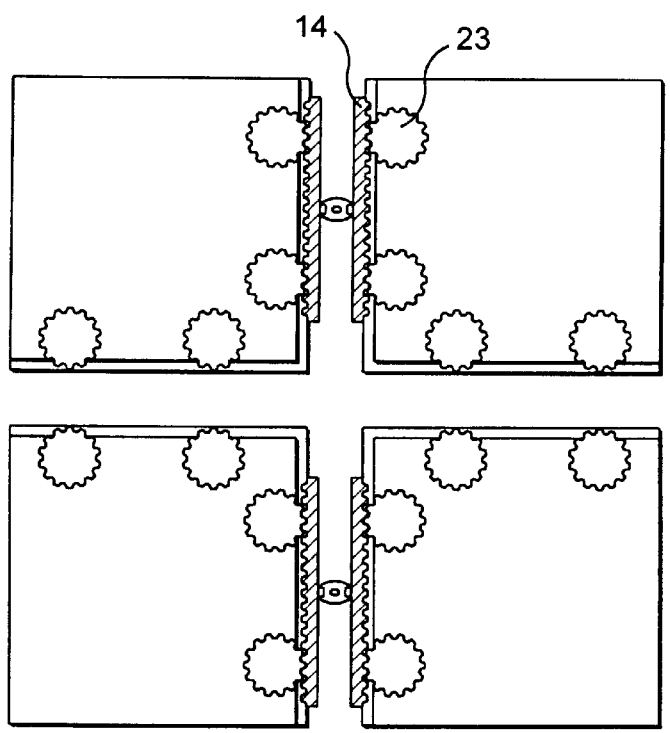
F I G. 11b

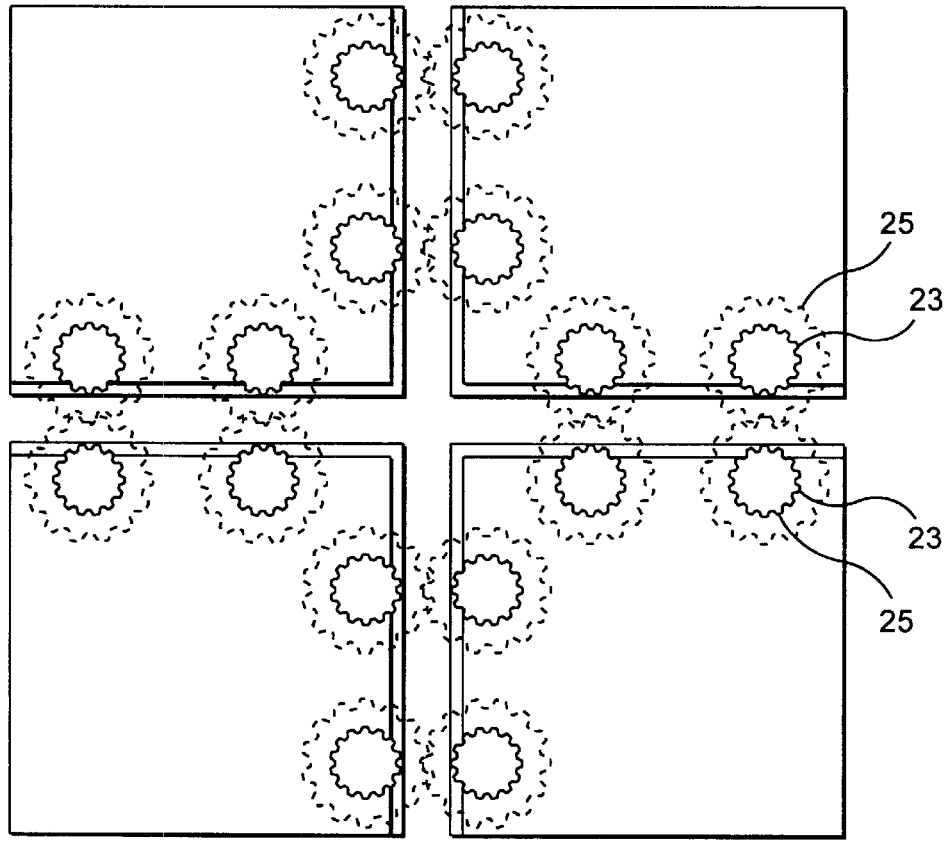
F I G. 12
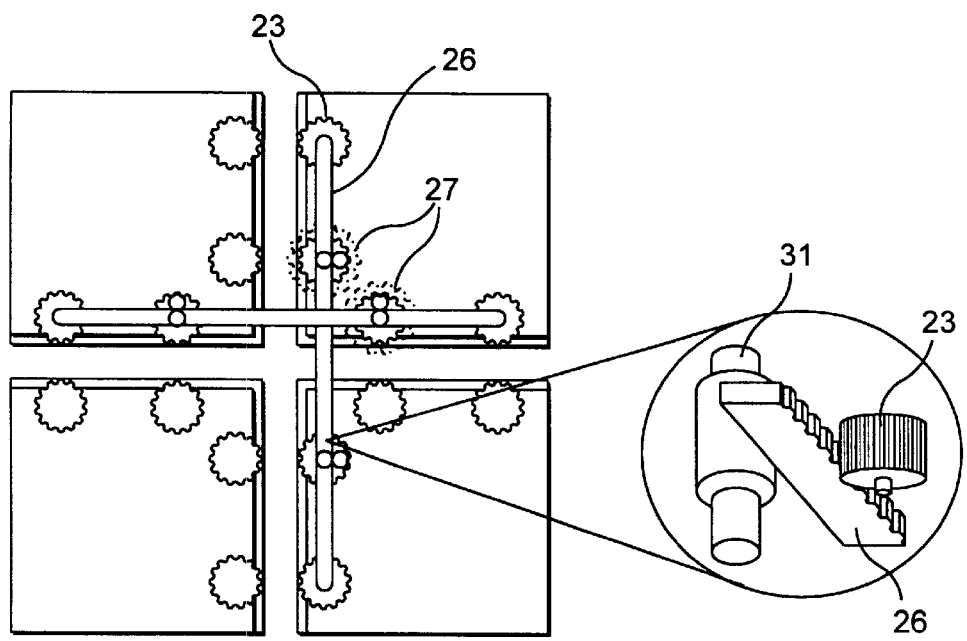
F I G. 13

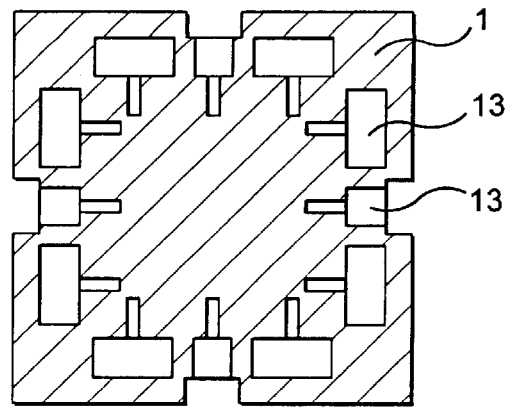
F I G. 14a
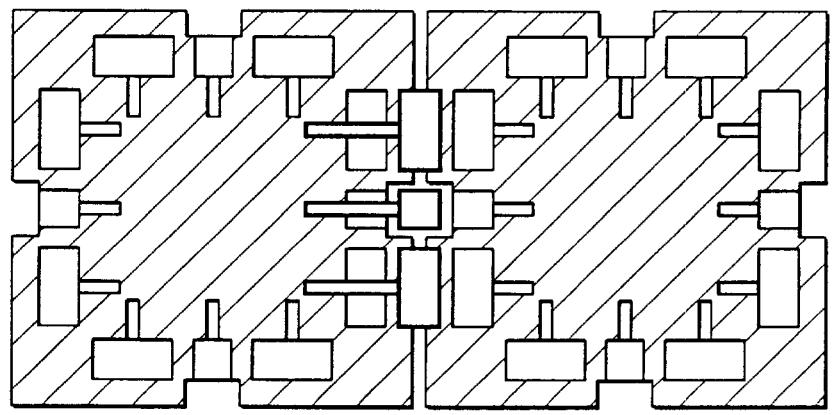
F I G. 14b
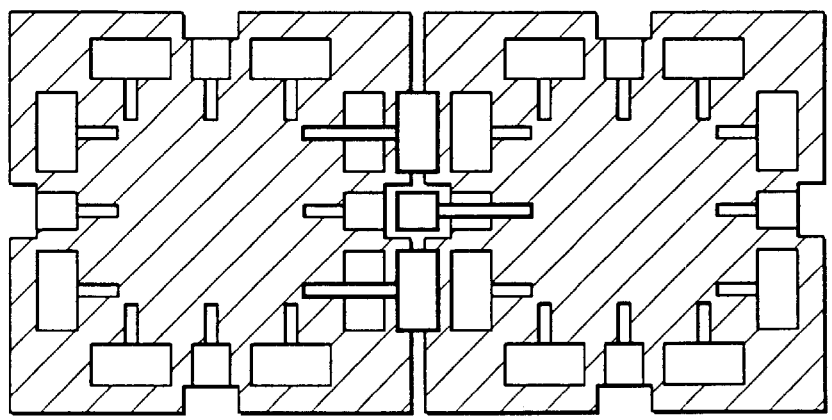
F I G. 14c

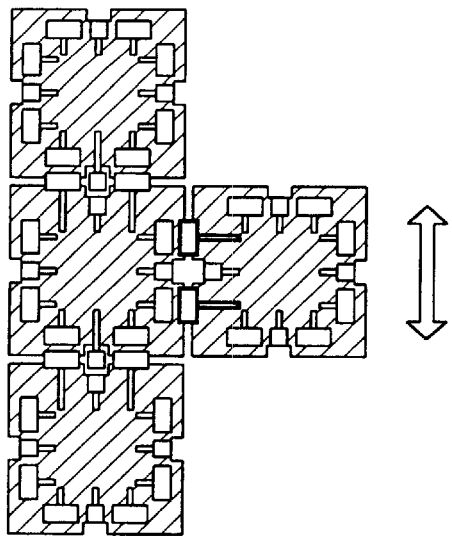
F I G. 15a
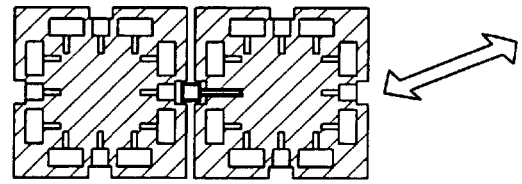
F I G. 15b
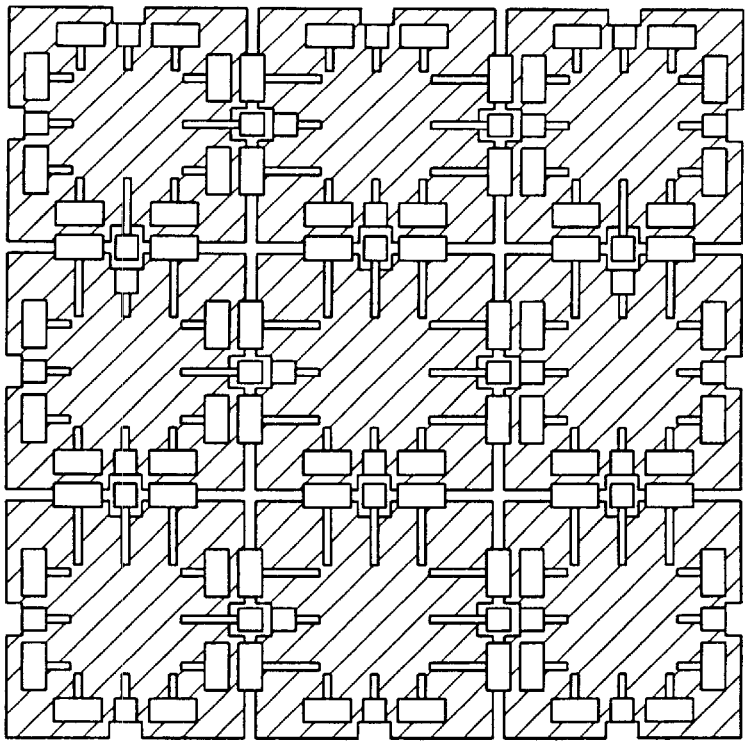
F I G. 15c

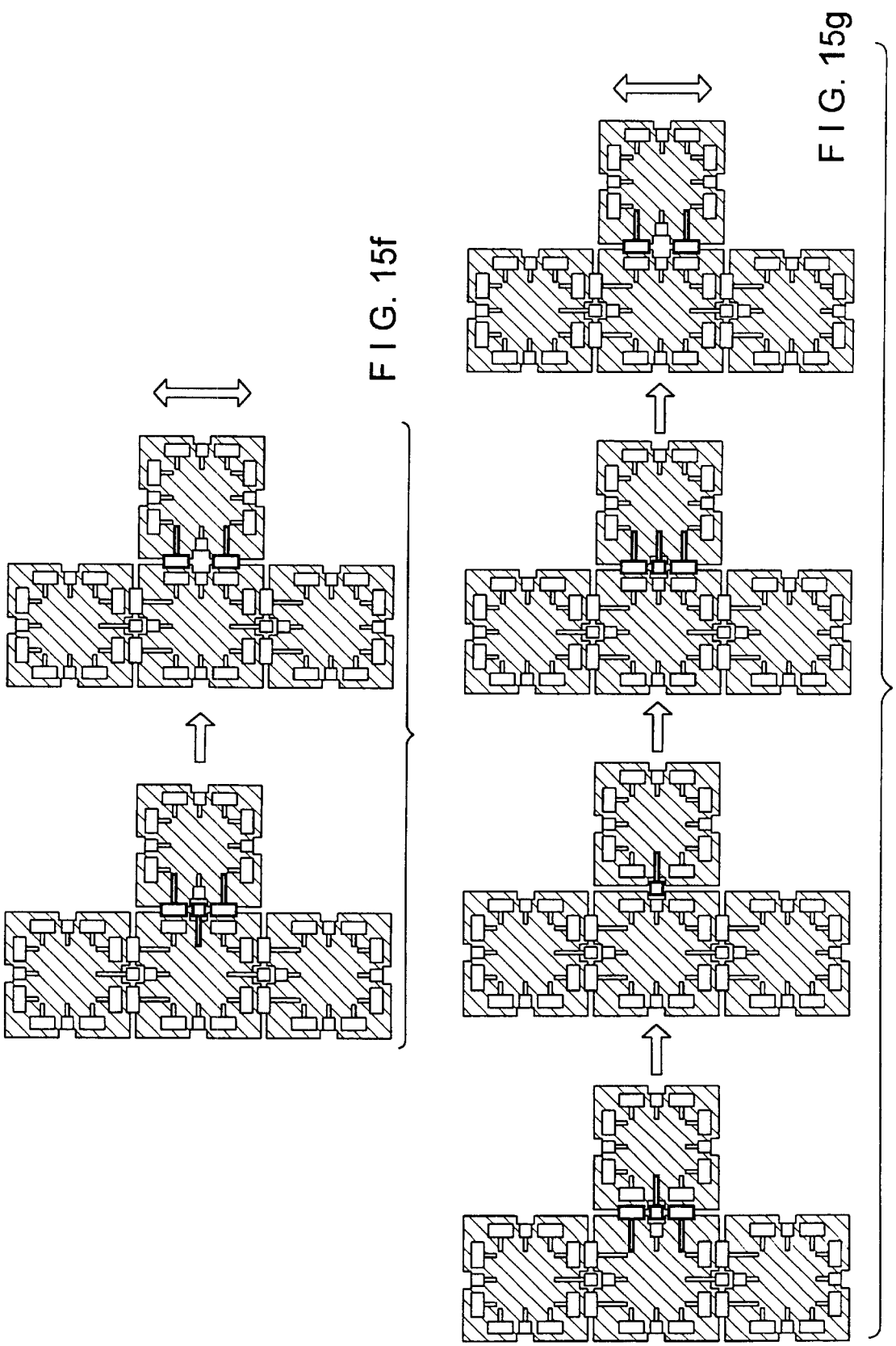

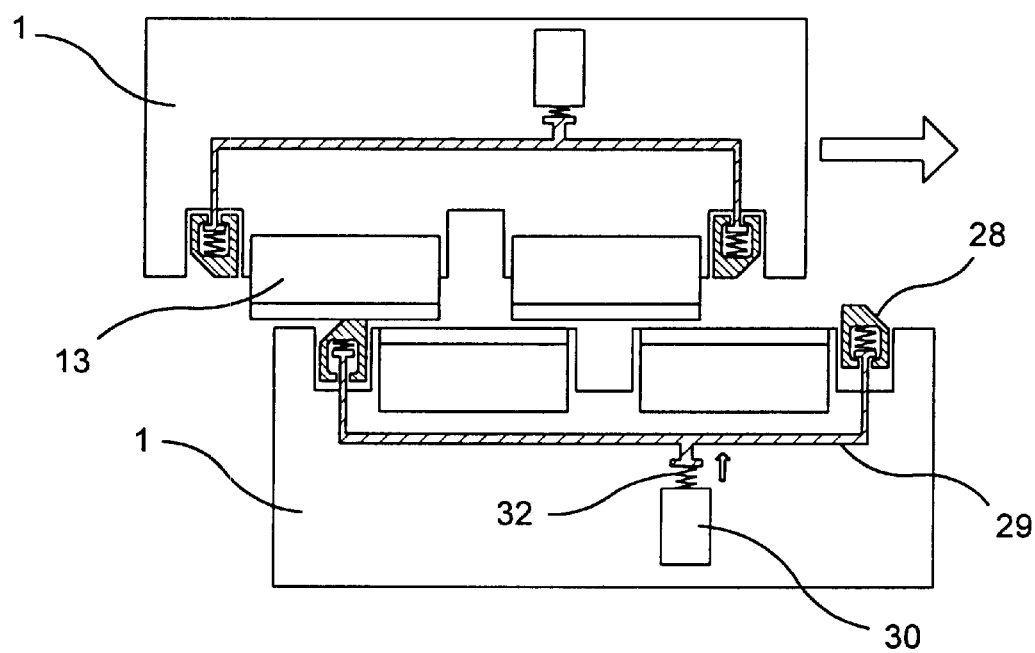
F I G. 16a
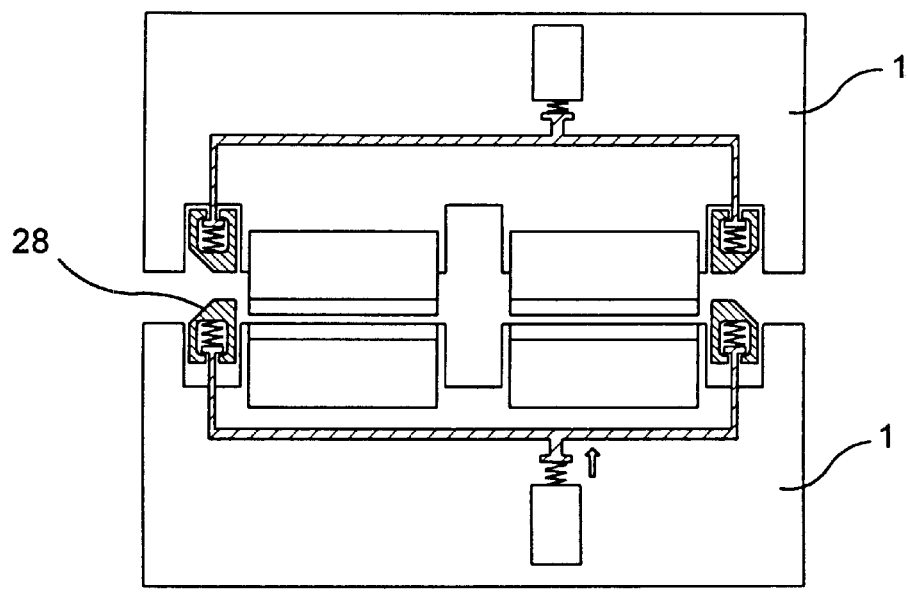
F I G. 16b

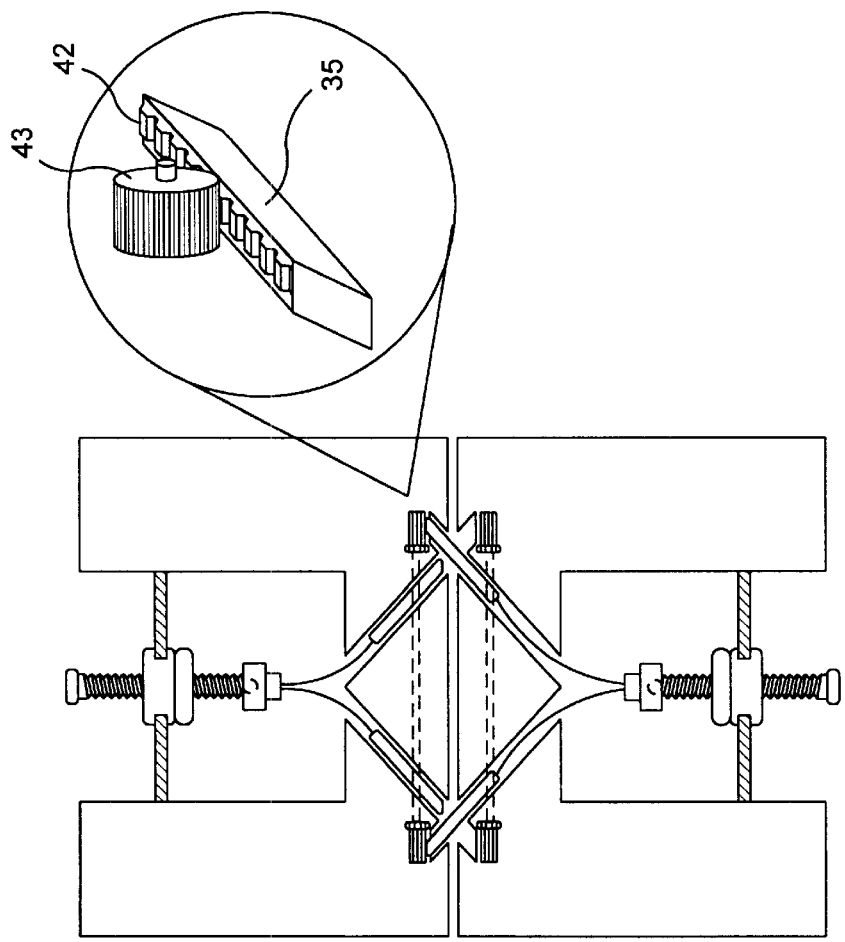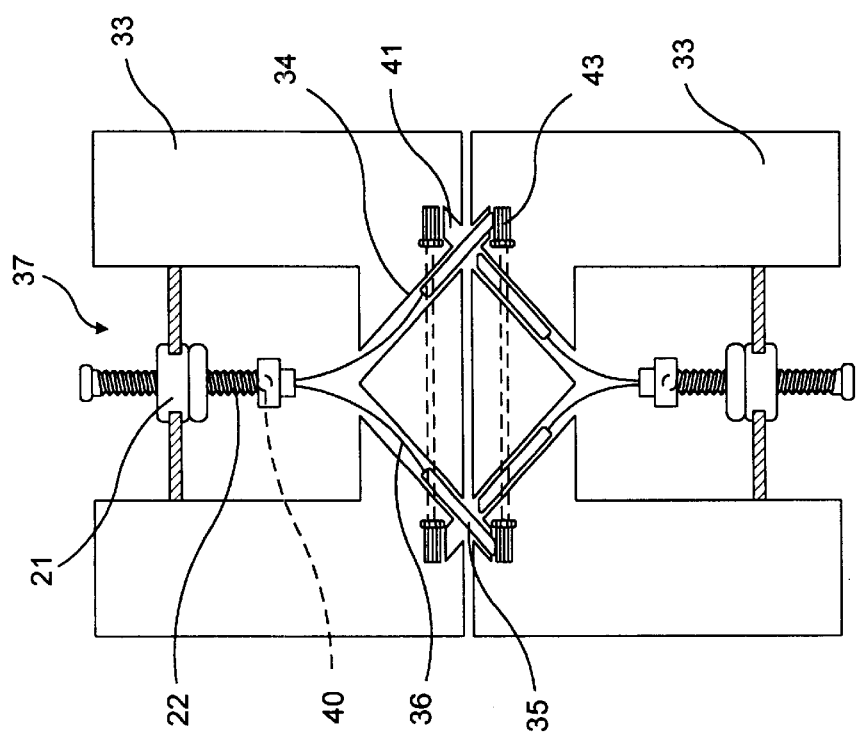
FIG. 17b
FIG. 17a

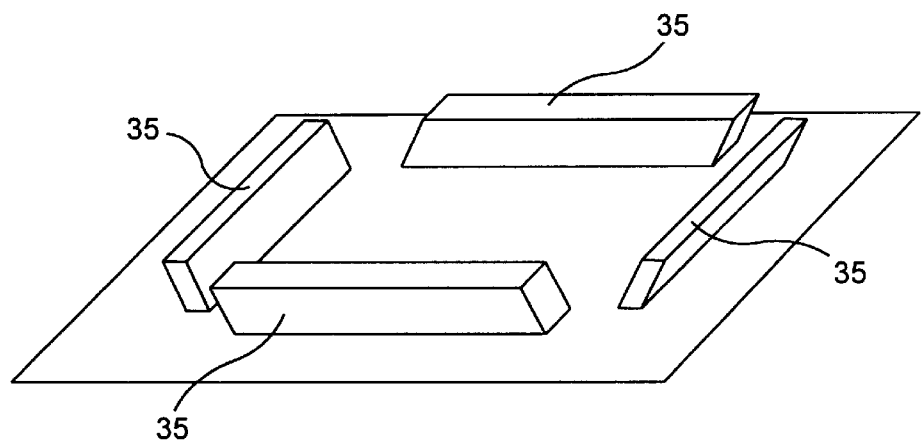
F I G. 17c
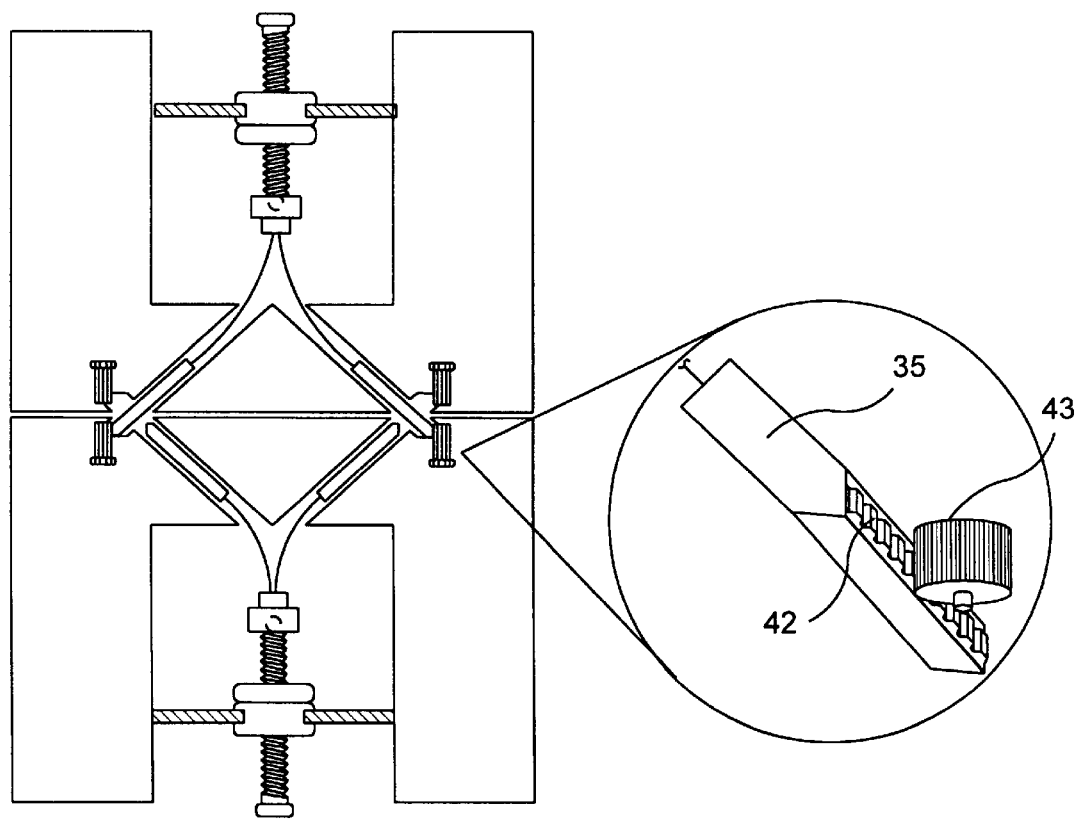
F I G. 17d

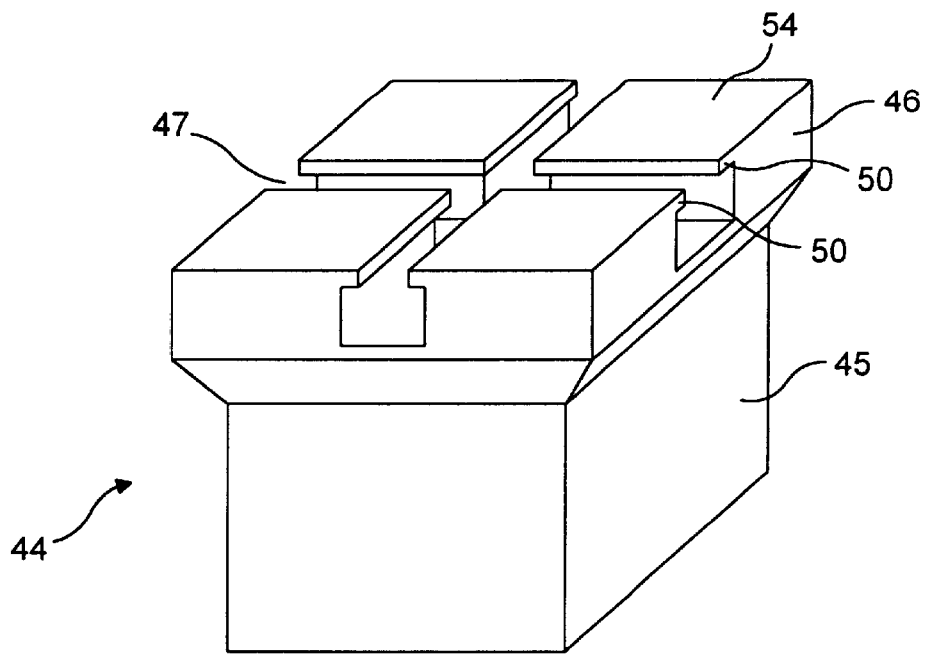
F I G. 19
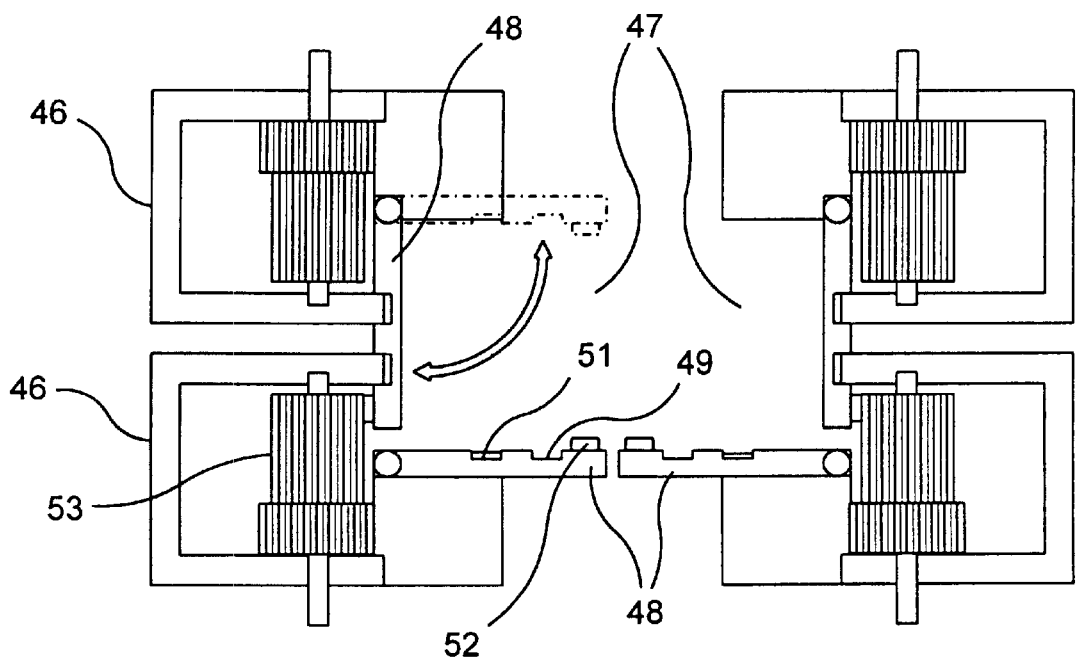
F I G. 20

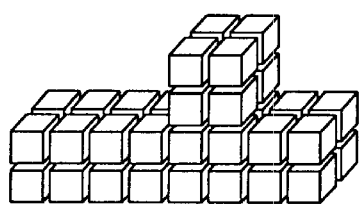
F I G. 27A
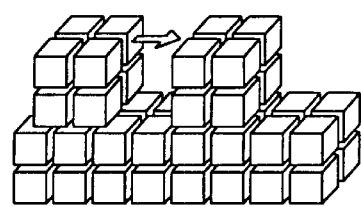
F I G. 27B
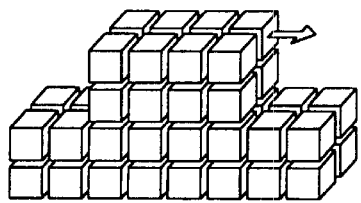
F I G. 27C
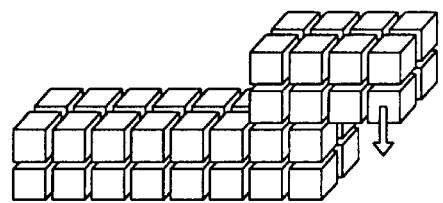
F I G. 27D
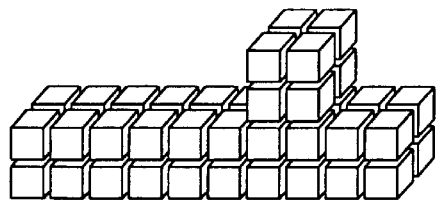
F I G. 27E
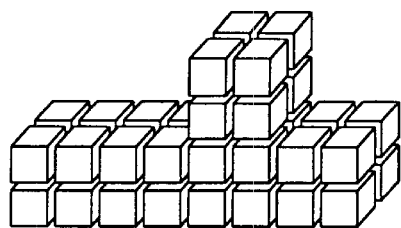
F I G. 28A
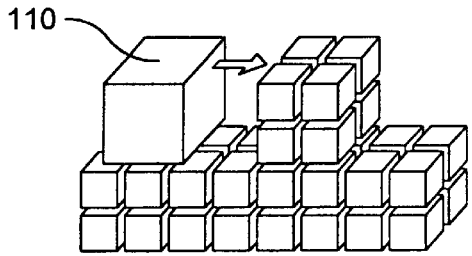
F I G. 28B
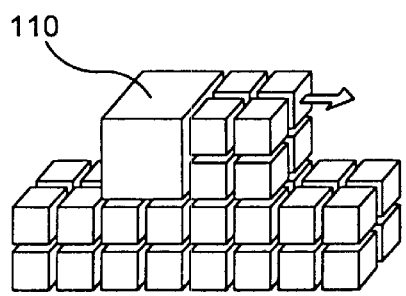
F I G. 28C
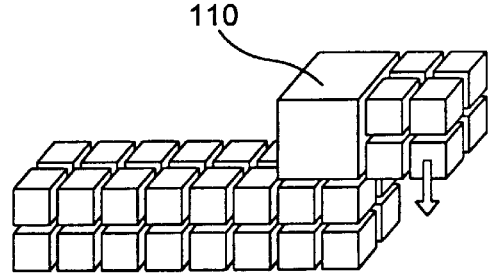
F I G. 28D

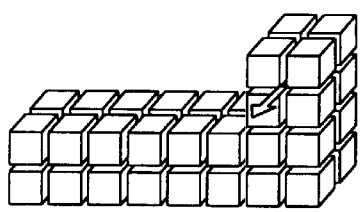
F I G. 30A
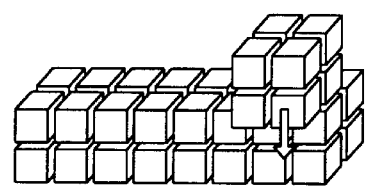
F I G. 30B
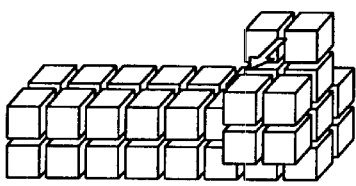
F I G. 30C
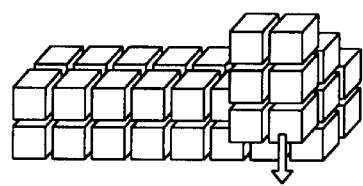
F I G. 30D
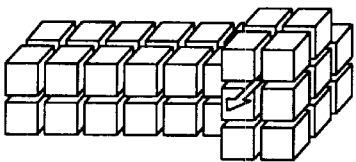
F I G. 30E
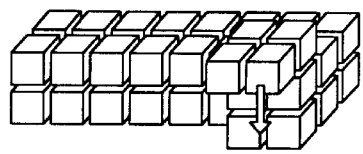
F I G. 30F
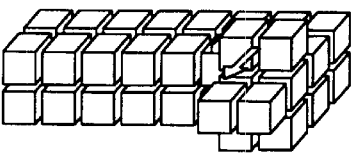
F I G. 30G
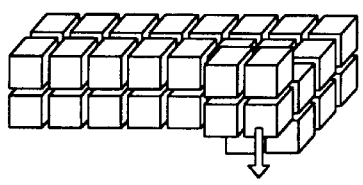
F I G. 30H
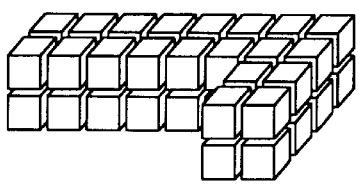
F I G. 30I

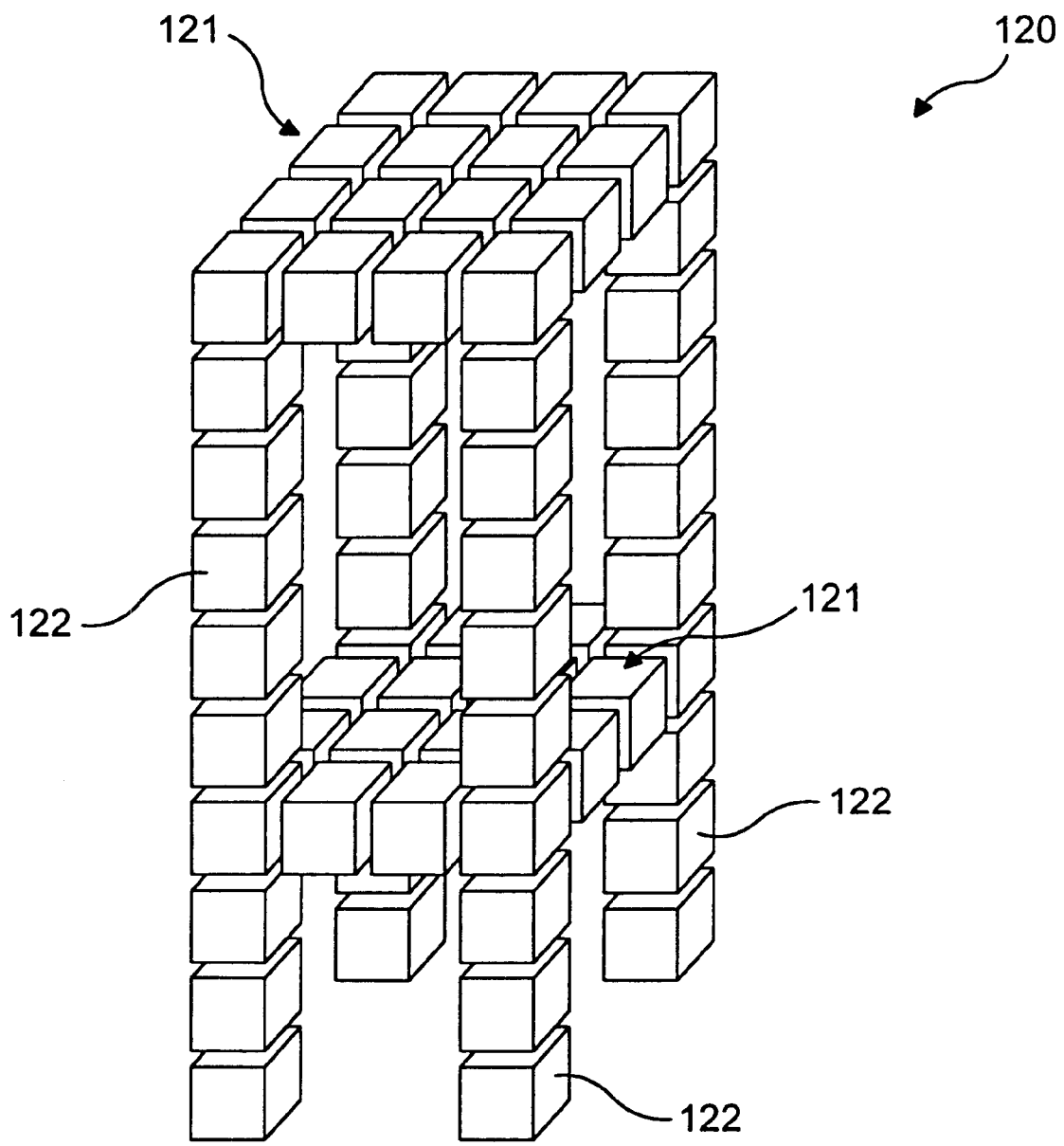
F I G. 31

PROGRAMMABLE MATERIALS

This application is a continuation of Ser. No. 08/727,557 filed Dec. 11, 1996 U.S. Pat. No. 6,157,872 which is a national stage of PCT/GB95/00460 filed Mar. 3, 1995.

The present invention relates to a programmable material.

Traditionally, machines and engineering structures have been constructed from parts each designed to perform a specific function at a specific position in a machine or structure. Such an approach limits the usefulness of the parts in other machines or structures.

The present invention reflects a very different approach to the design and construction of machines and structures.

The invention provides a machine of substantially parallelepiped shape, having means for so interacting with identical machines as to cause relative transport of them and the machine, and means for interacting with identical machines so as to secure the machine in position relative to them.

The machine is of substantially parallelepiped shape so that rows, sheets and blocks of closely spaced, or adjacent identical machines can be formed. They are also of that shape so that a machine may move or be moved over such a row or sheet whilst keeping one of its faces parallel and close to or adjacent to the exposed faces of the machine of the row or sheet. Clearly the machine may depart from an exactly parallelepiped shape by the removal of parts of its faces not needed for interacting with neighbouring machines.

The machine may be responsive to external signals communicated to it so as to effect the transport and securing.

Additionally or alternatively, the machine may incorporate a computer and be responsive to signals generated by that computer so as to effect the transport and securing.

The securing means or the transporting means or both may comprise electromagnets.

The transporting means or securing means or both may comprise mechanical parts or features on the machine that interlock with complementary parts or features on identical machines.

The transporting means may comprise mechanical parts or features on the machine that can be caused to interlock with complementary parts or features on an identical machine in such a manner as to allow relative motion of the machines along particular axes. Those parts or features may be arranged to provide two or more independently engageable interlocks between the machine and an identical machine, each of which allows relative motion of the two machines only along a respective one of two or more different axes.

The interlocking parts or features may comprise a member extensible from the machine into a recess or groove in an identical machine, the member incorporating extensible wedges for locking the member in the recess or groove.

The interlocking parts or features may comprise pairs of members, the members of a pair being extensible from a face of the machine, in different directions at an angle to the normal to that face, into respective ones of a pair of recesses or grooves in a face of an identical machine.

The interlocking parts or features may comprise pairs of members, each member of a pair being mounted to pivot between a withdrawn position and an extended position. Advantageously, the members of a pair receive at their withdrawn positions, in respective grooves in the members, respective ones of a pair of opposing lips from an identical machine.

The machine may comprise a plurality of studs on a face of the machine engageable with a neighbouring identical machine so as to locate it in position, the studs being retractable so as to release the neighbouring machine.

The studs may be engageable with interlocking mechanical parts or features of the neighbouring machine.

The studs may be depressible by an identical machine that is advancing to become such a neighbouring machine.

The machine may be of substantially cuboid shape, which is preferably a cube.

The machine may have four means on each face of the machine for communicating power or data with neighbouring identical machines, those means being located in the same positions on each face and being so located either on each of the diagonal centre lines or on each of the orthogonal centre lines of each face as to preserve the four-fold rotational symmetry of the face.

Additionally or alternatively, the machine may have coaxially arranged means mounted centrally on each face for communicating power or data with identical machines as to preserve the four fold rotational symmetry of the face.

Additionally or alternatively, the machine may have four pairs of an input means and an output means for communicating data with neighbouring identical machines, those means being located in the same positions on each face and the input means and output means of each pair being so located symmetrically to either side of each of centre lines of the face so as to preserve the four-fold rotational symmetry of the face.

The invention provides a machine equivalent in size to a parallelepiped block of a plurality of machines according to the invention, that is not composed of such machines and that has means for so interacting with such machines as to cause the relative transport and securing that would occur if the machine consisted of a parallelepiped block of machines.

The invention further provides structures and machines assembled from machines according to the invention.

The invention also provides a method of moving a first machine from a first site aligned with and neighbouring a second site, in a direction parallel to the neighbouring sites, wherein each site is a machine according to the invention.

The first machine may have neighbours that are secured to it and that move with it.

The method may be repeatedly applied to move a machine along a row of machines, and advantageously that motion is continuous.

The invention further provides a method of extending by one unit, a streamer of units in a row ending in a tip unit, the units either being single machines according to the invention, or being parallelepiped blocks of such machines, the method comprising moving a pair of units along the streamer until one of the pair is a neighbour of the tip unit and the other extends beyond the tip unit, and moving the other unit of the pair from being a neighbour of the one unit to being a neighbour of the tip unit, in which position it becomes the new tip unit, the movement of the machines being according to the invention.

The invention also provides a method of extending by one unit a streamer of units in a row beginning in a base unit, the units either being single machines according to the invention, or being parallelepiped blocks of such machines, the base unit having one or more neighbouring machines that are not in the row, the method comprising adding an extra unit to the row before the base unit and advancing the row relative to the one or more machines neighbouring the base unit a distance of one unit in the direction that results the extra unit moving to the original site of the base unit.

The invention also provides a method of retracting a streamer comprising reversing the steps of either of the methods of extending a streamer according to the invention.

The invention further provides a method of delivering machines according to the invention from a first point to a second point, comprising constructing from such machines a structure connecting the two points and moving the machines along the structure from the first point to the second point.

The invention also provides a method of constructing a structure comprising machines according to the invention, the method comprising either of the methods of extending a streamer according to the invention.

By analogy with plastics chemistry, the individual machines will be referred to as "monomers" in the description, which follows, of examples of the present invention. Clearly the correspondence is not complete; for example, chemical monomers do not transport each other.

The ability of the monomers to transport each other means that the material can form itself into structures without the need for tools to fashion it. To build a structure, monomers are delivered by the material itself to desired positions. The material is programmable in the sense that many different structures can be built from the same monomers and so a "programmable material" is a name which can be given to a collection of monomers.

There will now be described, by way of example only, materials according to the present invention and methods according to the present invention of forming them into structures and machines. Reference will be made to the accompanying Figures, of which;

FIG. 1 shows some basic structures formed from cubic brick monomers.

FIG. 2 shows some further structures formed from the monomers.

FIG. 3 shows normal and L-type streamers.

FIG. 4 shows a monomer which has grooves along the orthogonal centre lines of each face.

FIGS. 5a and 5b show the monomer with locks being extended and with the locks in the fully extended position respectively.

FIG. 6 shows the mechanism for extending the locks.

FIG. 7 shows wedges extensible from the locks.

FIG. 8 shows the mechanism for extending the wedges.

FIGS. 9a–d show some cross sections of two neighbouring locks of the monomers and how they interlock.

Figure 10:
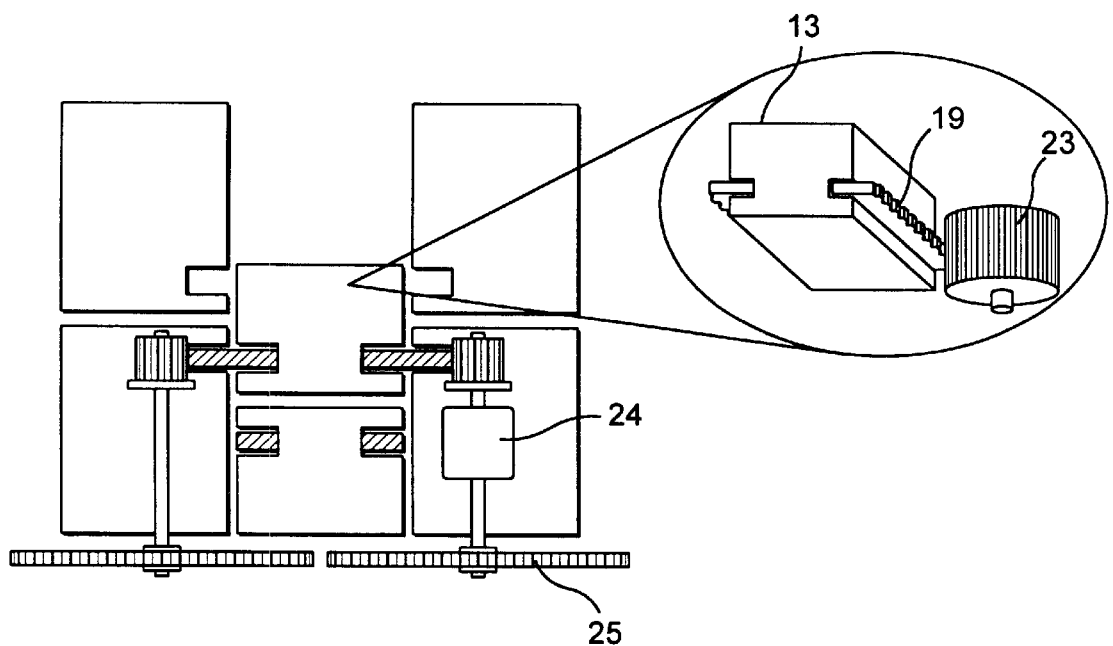

FIG. 10 shows how the monomers are made to move relative to each other.

FIGS. 11a and 11b show the positions of the gears used to move the monomers.

FIGS. 12 and 13 show the mechanism for driving the gears.

FIGS. 14a–c and 15a–g show the locks in various positions for transporting and securing monomers.

FIGS. 16a and 16b shows a mechanism for locating the monomers in position.

FIGS. 17a–d show a second type of monomer and its mechanisms for transporting and securing identical monomers.

Figure 18A:
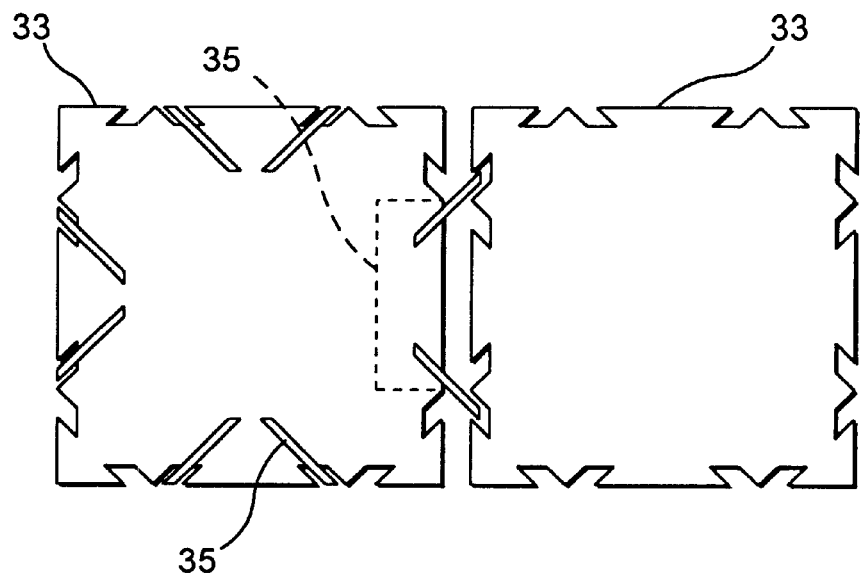
Figure 18B:
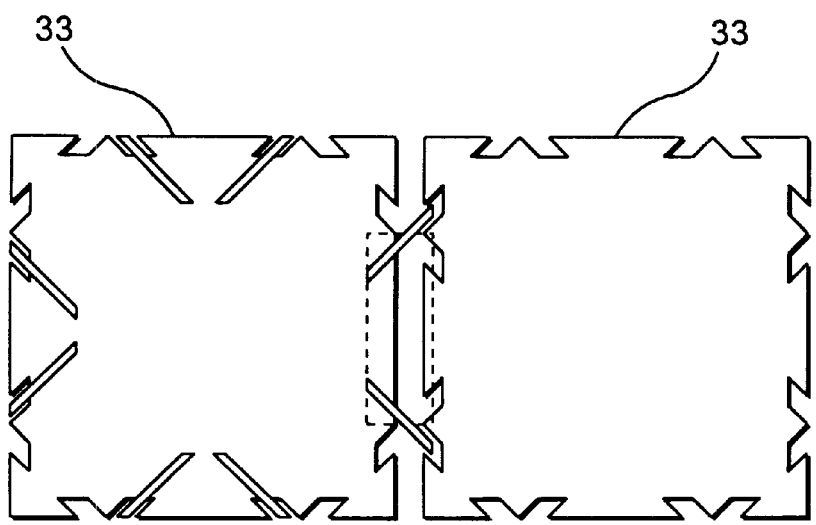

FIGS. 18a and 18b show configurations of wedges of the second type of monomer for transporting and securing of other identical monomers.

FIG. 19 shows a partly complete monomer of a third type.

FIG. 20 shows the operation of the hinged locks used in the third type of monomer for transporting and securing.

Figure 21:
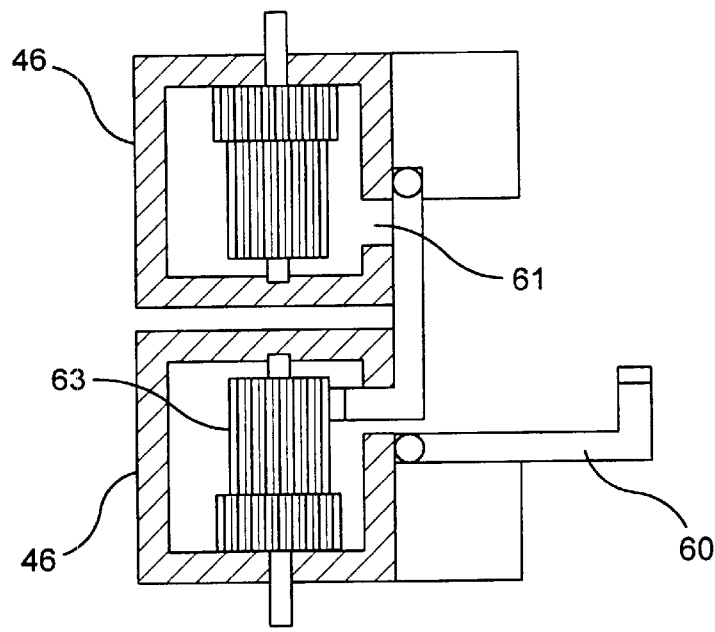
Figure 22:
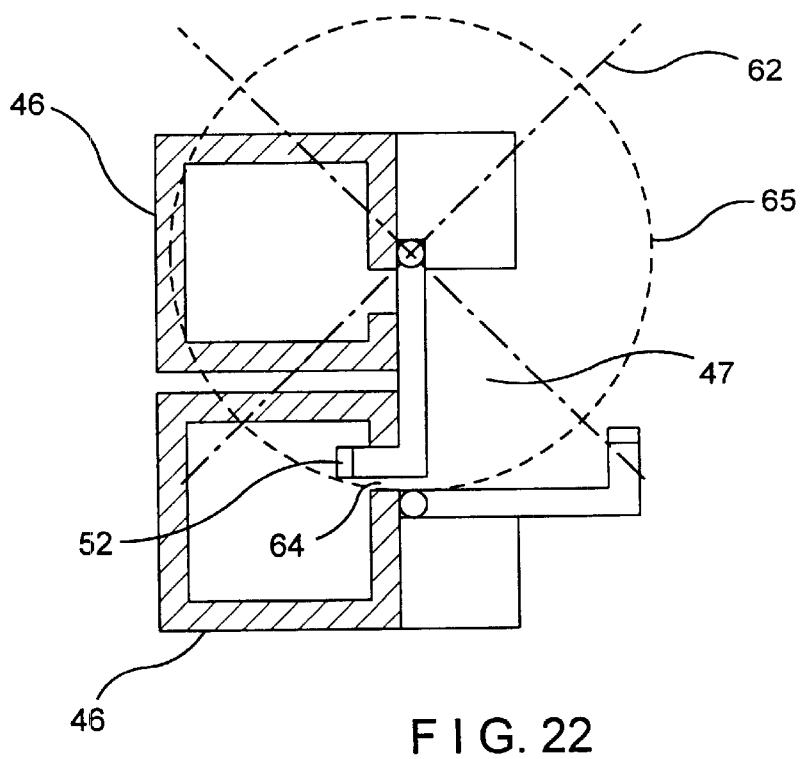

FIGS. 21 and 22 show a variant of the hinged locks.

Figure 23:
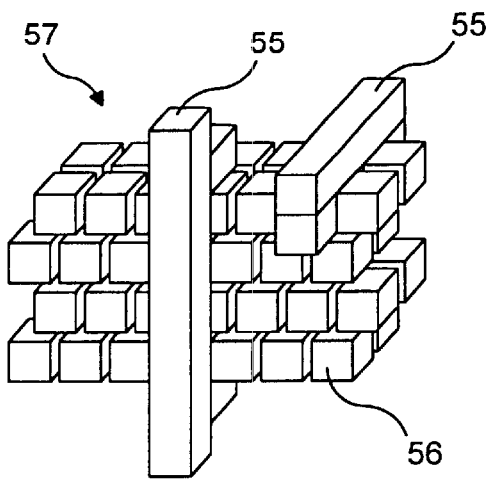

FIG. 23 shows a wall of electromagnetic monomers.

Figure 24:
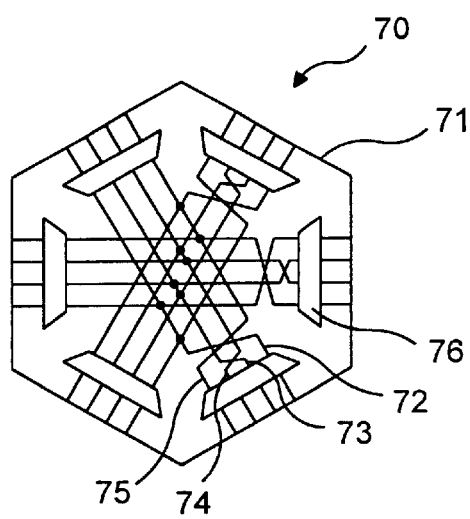

FIG. 24 shows connections between the faces of a monomer for data and power.

Figure 25:
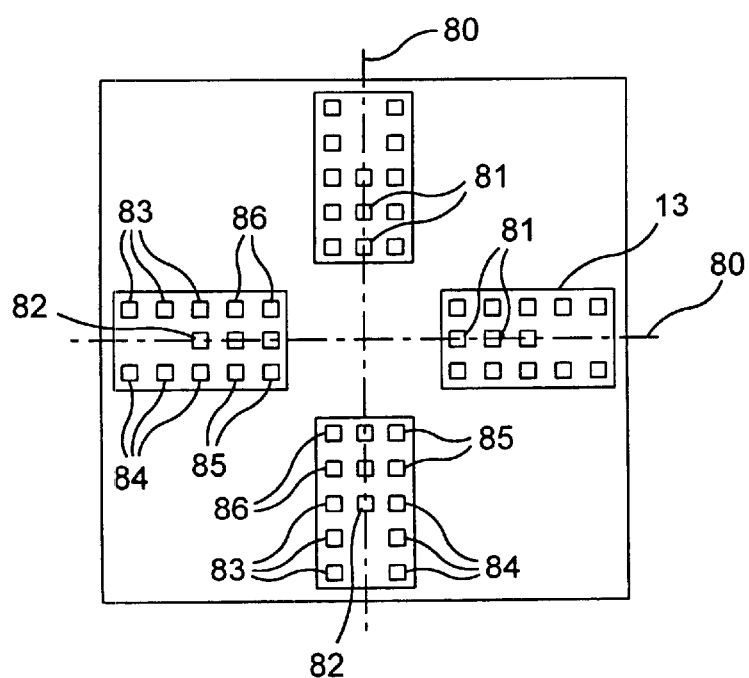

FIG. 25 shows an arrangement for the contacts for data and power on the surface of a monomer.

FIGS. 26a–e show how an L-type streamer grows.

FIGS. 27a–e show the growth of an L-type streamer where the units are 2×2×2 blocks of individual monomers.

FIGS. 28a–d show the growth of an L-type streamer where some of the units are 2×2×2 blocks of individual monomers and some are larger monomers of an equivalent size.

FIGS. 29a–f show methods for changing the direction of growth of an L-type streamer through 90°.

FIGS. 30a–i show a method of turning a streamer comprised of 2×2×2 units through 90°.

FIG. 31 shows a tower formed of monomers.

Referring to the accompanying drawings, and initially to FIG. 1, monomers 1 are in the form of cubic bricks. Each monomer is provided on each face with means (not shown in FIG. 1) for securing it face-to-face with another similar monomer and for causing relative movement of the two monomers parallel to the edges of the face. The monomers can be assembled to form almost any desired shape, and as examples a solid block 2, a wall 3, and a flat sheet 4 are shown in FIG. 1. A solid block can be thought of as being composed of a series of adjacent solid walls or as flat sheets stacked together. FIG. 2 shows some further shapes 5 and 6. The shape 5 is yet another object that is contained within the solid block 2 depicted in FIG. 1. Just like the walls and sheets, there are many other objects that can be contained in a solid which can be realised if an existing set of monomers is sculpted or rearranged by addition of monomers, removal of monomers, rearrangement of monomers, or a combination thereof. This kind of sculpting or re-arrangement can be achieved by using the means incorporated in the monomers to move monomers around the surface of the object, as is described in more detail below. Computers and software can be used to control the movement of the bricks to automate the shaping process.

The bricks can be arranged into machines, for example, a walking machine 6 as is shown in FIG. 2. It is shown below how to make the machine 6 walk.

There are important mechanisms, which will be described in depth below, that are the building blocks of basic programmable material operation. As a brief example of these, two such mechanisms are shown in FIG. 3, the normal streamer 7 and L-type streamer 8.

The normal streamer 7 is a rod-like protrusion which can grow out of a surface. The rod grows in a direction normal to the surface. It is extended one monomer at a time by attaching a monomer at the rear of the rod and pushing the rod out. The L-type streamer 8, on the other hand, grows by attaching more monomers one at a time to the front of the streamer. These mechanisms are fully reversible. That is, they can contract as well as grow.

Having briefly discussed structures formed from monomers, the monomers themselves will now be examined in more detail.

Referring to FIG. 4, one form of monomer indicated generally by the reference numeral 1 is cubic in shape and has a pair of grooves 11 in the shape of a cross on each face, dividing the face into four. The grooves 11 are called major grooves. The walls of the grooves 11 each have an additional groove 12 etched into or otherwise formed in them and this is called the minor groove. This minor groove will provide the necessary grip when monomers are sliding along the underside of other monomers or when scaling walls.

The major groove 11 contains within it locking and traction mechanisms (not shown in FIG. 4). The locking mechanism allows for monomers to be firmly locked together. The traction mechanism allows the monomers 1 to move relative to each other. When moving, the monomers 1 must not separate since they could be travelling along the underside of other monomers 1 or they could be scaling walls.

Referring to FIG. 5, both the traction and locking mechanisms are provided, at least in part, by retractable flange-like protrusions on locks 13, located within the major grooves 11 of each monomer 1, which can be extended and can reach into the major groove 11 of an adjacent monomer 1. On each face of the monomer 1 there are four of these locks 13, one in each arm of the cross formed by the major grooves 11. The locks 13 are operated as two pairs, each comprising of the two aligned locks in a single major groove 11. If one pair of locks is extended, then the two adjacent monomers can slide relative to one another only in the direction of the major groove in which those locks are. If both pairs of locks are extended, then the two monomers cannot slide past one another in any direction.

FIG. 6 shows how the lock 13 is pushed out of and is retracted into its monomer 1. A motor 21 fixed within the monomer 1 below the major groove 11 has a screw spindle 22 that extends or retracts as it rotates, depending on the direction in which the electric motor rotates it. The end of the spindle 22 is connected to the lock 13 by a ball-and-socket decoupling mechanism 40 in such a manner that as the spindle screws in or out, the lock is extended or retracted without rotating.

The locks 13 have retractable wedges 14 (see FIG. 7) inside them. These wedges 14 have to be fully retracted into the lock 13 when the lock is being retracted into or extended from its major groove 11, but once it has reached into the major groove 11 of another monomer 1, the wedges 14 are pushed out and engage in the minor grooves 12 of the adjacent monomer. The wedges 14 then lock the two monomers 1 together such that they can slide along the axis of the pair of locks but cannot separate. The wedges 14 have toothed edges 19 for a rack and pinion mechanism which will be employed to move the monomers 1. Also shown in FIG. 7 are power and signal contacts 15 which are on the surface of the locks 13. When the locks 13 are inserted into the major groove 11 of another 1 for locking, the contacts 15 make electrical contact with the corresponding contacts on the locks 13 belonging to the other monomer, which are in their retracted position at the bottom of the major groove 11 of that other monomer. The contacts are pads of a conductor material deposited on a insulating material which is deposited on the metal of the lock. The low profile of these pads allow the locks to slide past each other when neighbouring monomers are moved. An alternative is to have a plug and socket arrangement in which the plugs of one lock can be extended to engage with the sockets of the lock of a neighbouring monomer. Such plugs would have to be retracted before monomers are moved.

FIG. 8 shows the mechanism used to push and pull the wedges 14 in and out. A rotary cam 16 has an oval groove 18 in which engages pins 17 to which the wedges 14 are attached, so that as the cam 16 rotates the pins 17, and with them the wedges 14, are moved symmetrically in and out. The rotation of the cam 16 is under the control of an electric motor 20 which is geared down to provide a sufficiently high driving force and slow speed of operation.

Figure 9A:
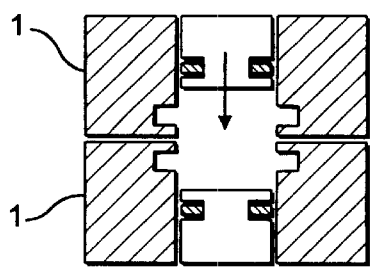
Figure 9B:
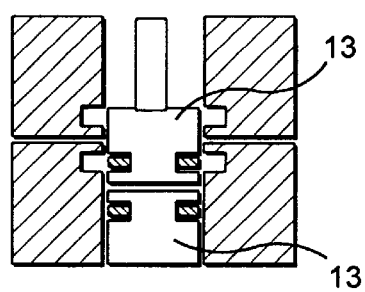
Figure 9C:
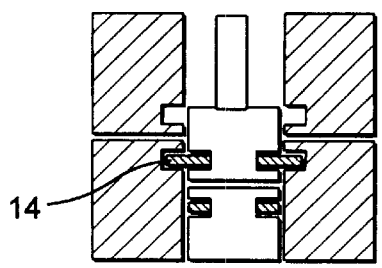
Figure 9D:
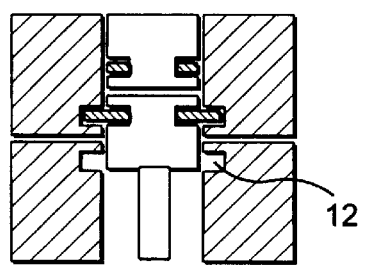

FIGS. 9a to 9d show the operation of the locks 13 with the wedges 14. The cut-away section of the two monomers 1 in FIG. 9a shows the locks 13 of both monomers fully retracted. In FIG. 9b, the lock 13 from the top monomer 1 has extended down into the monomer 1 below. The contacts 15 are not shown in FIG. 9, but at this point they are engaged, enabling power and signals to be transferred from one monomer to the other. In FIG. 9c the wedges 14 are extended and the monomers lock together. The monomers 1 are now inseparable, but because the lock 13 and its wedges 14 confine the monomer in only two axes (movement not possible left to right or up and down as seen in FIG. 9c), the monomers 1 are free to slide relative to one another in and out of the plane of the paper. This mechanism is reversible and can operate as shown in FIG. 9d, where the monomer 1 at the bottom has locked to the top monomer 1.

It will now be described how, following on from FIG. 9c, the top monomer 1 can be moved. FIG. 10 shows two monomers locked together by a lock 13 extended from the top monomer 1 to the bottom monomer 1. The toothed racks 19 on the wedges 14 of the lock 13 engage pinion gears 23 of the bottom monomer. That provides a rack and pinion mechanism by which the monomers can be moved relative to each other. A pair of gears 23 opposite one another on either side of a major groove 11 are linked by large gears wheels 25 below the major groove. As shown in FIG. 10, the pair of gears 23 is driven by an electric motor 24 on the spindle of one of the gears.

The number of gears 23 and their locations on a typical face of a monomer 1 are shown in FIGS. 11a and 11b. The use of several pairs of gears 23 along a major groove 11 is required to ensure that, as a top monomer 1 is moved along a row of bottom monomers 1, when the leading lock 13 of a pair is pushed along on to the next monomer 1 in the row, the wedges 14 of the trailing lock 13 of the pair are still engaged by gears 23 until the first pair of gears 23 of the next bottom monomer 1 grips the wedges 14 and starts to pull the top monomer.

All of the gears 23 on one face of a monomer 1 can turn at the same time, with a consequent simplification of the control and drive trains. This is because, at any time, when movement is to occur, only one pair of locks 13 are engaged, either as shown in FIG. 11a or as shown in FIG. 11b, and the gears 23 in the other major groove 11 can revolve freely.

A top view of the gears 23 and their linking gear wheels 25 (in outline) are shown in FIG. 12. Wherever there is overlap between the linking gear wheels 25 as seen in plan view, they are placed at different heights to avoid any spatial conflict.

As shown in FIG. 13, a system of toothed belts 26 connects the gears 23, transmitting the drive from one pair of gears 23 to another. Only one motor 24 is then necessary for all of the gears 23 along a major groove 11, and it is ensured that all of the gears will rotate at the same speed. The belts 26 are held against the gears 23 by a set of free spinning rollers 31 (also shown in FIG. 13). Two belts 26 are needed to drive all the gears 23 of one face of the monomer, one belt for each of the two axis. The two belts 26 are set at different heights so that they do not interfere with each other. These belts 26 are set below the locking mechanism so that they do not interfere with the up and down motion of the locks 13. One large gear wheel 27, which may be one of the large gear wheels 25, on each belt 26 is meshed with a similar large gear wheel 27 on the other belt 26, as shown dotted in FIG. 12. That links all the wheels together so that one motor 24 can drive them all.

As shown in FIGS. 9c and 9d, there is a gap maintained between the monomers 1 as a result of the engaged wedges 14. This gap can be very small (less than 100 micrometers)

or it can be set to around 1–2 millimeters. To make sure that the monomers 1 are not touching at any time, the gap needs to be wide and set around 1 millimeters. Too small a gap means that the mechanism could jam. This is important as monomers 1 are continually being moved relative to one another in use, and they should not rub against each other. Mechanisms such as the normal streamer 7 (FIG. 3) are particularly prone to jamming without good inter-monomer gap. The clear gap can be seen in FIGS. 1 to 4 where the monomers are drawn as separate bricks. Preferably the gaps are set such that the monomers 1, apart from their locks 13, never touch.

With monomers 1 that do not touch, stability of a structure is maintained by ensuring that the locks 13 are made of strong materials. Additional bolts can be employed on the surface of the monomers 1 to provide even more rigidity when in a locked position.

When moving monomers 1, the locks have to provide for stability and tolerate vibration. Stability can be provided by wider lock mechanisms that stop rocking movement. The width of the lock determines how stable a monomer is as it is moved. Thinner locks will tend to permit the monomers to wobble more as they are moved. Wider locks are less economical. A width of around one quarter to one fifth of the total width of the monomer is believed to be in general a reasonable compromise where mechanical stability is ensured for economic use of materials.

To allow the monomers to move, there must be some play when one pair of locks 13 are engaged. However, when both pairs of locks 13 are engaged so as to secure the monomers 1 in position, this play is not desirable. This problem can be avoided by engaging the wedges 14 further so that they engage into the other monomer 1 more tightly. The wedges 14 thus have three operating positions—fully withdrawn, partially extended (when relative motion of the monomers is desired) and fully extended (when it is desired to secure the monomers).

Before a monomer 1 is moved, there are a variety of starting positions for the locks 13. The monomer that is to be moved may have all its locks 13 extended into the body of another monomer 1. The other monomer 1 may have its locks 13 extended into the monomer 1 that is to be moved. Another situation is that locks 13 extend from both monomers 1 into each other. These starting positions may have to be changed to correct the insertion of the locks 13 before the monomers 1 are moved in the desired direction.

Consider FIGS. 14a–c and 15a–g which show the locks 13 in diagrammatic manner in cross section of a monomer 1. Not all locks can be represented because the monomer is three dimensional, but the two dimensional section is sufficient to illustrate many points regarding movement of monomers. In each of FIGS. 14a to 15g, for each of the four sectioned faces of the monomer there are shown in side view the two locks 13 in the major groove 11 that runs along the plane of the paper and, between them, an end view of one of the locks 13 in the major groove 11 perpendicular to the plane of the paper.

FIGS. 14a shows all the locks 13 retracted. FIGS. 14b, 14c, 15a and 15b show a series of examples where various groups of locks have been pushed out, as if to engage neighbouring monomers (not shown).

FIGS. 14c and 15a show left and right pairs of locks in the plane of the paper extended. In FIG. 15a, that allows the monomers to move up or down, propelled by. the gears 23 in the monomers to its left, while in FIG. 14f the right monomer 1 has pushed into the left monomer 1 the pair of its own locks 13 that is at right angles to the locks 13 extended from the left monomer 1, so that the two monomers are locked together against movement in any direction.

FIGS. 14c and 15b show locks 13 normal to the plane of the paper extended. In FIG. 15b that allows the monomer to move into or out of the plane of the paper, propelled by monomers to the left, while in FIG. 14f, as noted above, the two monomers are locked together.

FIG. 14b shows all of the locks 13 on one face of a monomer 13 extended, fixing the monomer relative to that adjacent to it.

FIGS. 14b and 14c illustrate two locking schemes where pairs of monomers 1 are locked to each other. The locking method of FIG. 14b from here on will be known as the "face lock" while the method of FIG. 14c will be known as the "complementary lock". The face lock is more suited to pick up dead or passive monomers 1 that have major grooves 11 and minor grooves 12 (but do not have locks), such as tools and equipment intended for use in conjunction with the monomers. A dead monomer 1 is a monomer 1 which is faulty and is unable to operate its locks 13 on command. Another use of the face lock is to latch onto structural supports (which are normally not active) for grip while climbing and moving about. The complementary lock on the other hand provides better structural strength because of the way stresses are evenly distributed between two monomers 1, and is therefore usually preferred for locking together two active monomers.

It has been mentioned above that engaging only one pair of locks allows the monomers 1 to slide along the axis of that pair of locks. FIGS. 15a and 15b show two possibilities, "sliding configurations", of the locks 13 engaging to allow movement of a monomer 1 across a face of a monomer 1. These movements are at right angles to each other.

In FIG. 15a the monomer on the right has its lock inserted into the monomer 1 on the left. The left monomer 1 activates its motors to move the right monomer up and down. Notice that while the right monomer is moving, it does not need power. The power to that monomer is switched off. It is effectively dead and all control over it, including its mechanisms, and its status, are lost. The mechanical power needed to move the monomer 1 is provided by the stationary monomers 1 on the left which use their electric motors 24. When the monomer 1 that is being moved reaches its destination, power can be routed into it once again through the locks 13 to regain control of its internal mechanisms.

In FIG. 15b the monomer on the right has its locks extended into the monomer on the left and can be moved into and out of the plane of the paper by a motor 24 of the left monomer 1.

There are several initial starting positions from which the locks 13 must change configuration to end up in one of the sliding configurations shown in FIG. 15a or in FIG. 15b. FIG. 15c shows a typical 3×3 array of monomers with a large variety of starting positions.

Figures 15D, 15E:
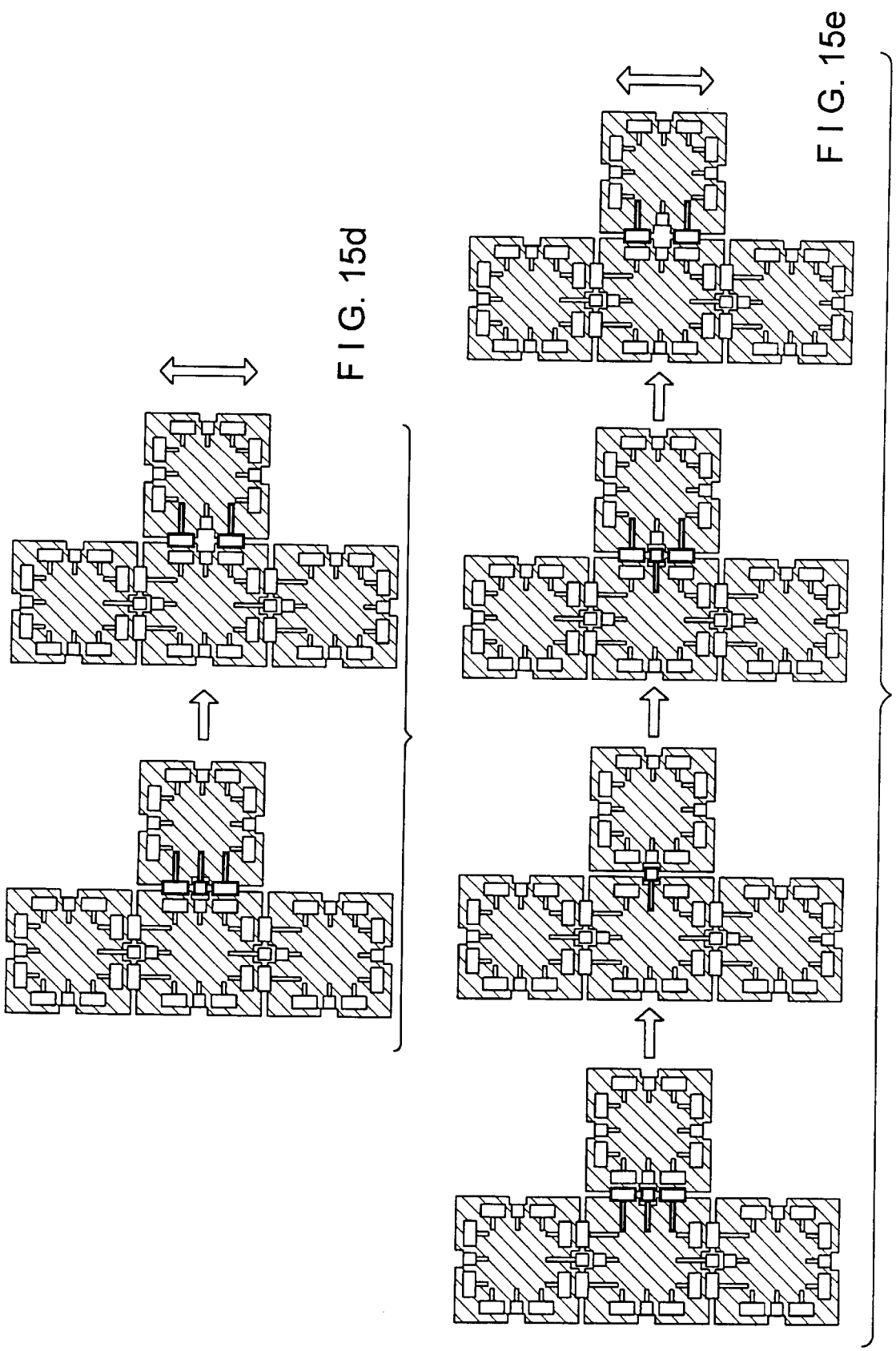

FIGS. 15d and 15e show how to get from two different possible cases of face lock to a sliding configuration. FIGS. 15f and 15g show how to get from two different possible cases of complementary lock to the sliding configuration. These four cases cover all the possible combinations of a starting position. It should be noted that in all instances, while the locks 13 are changing configuration, power transmission and mechanical locking between the monomers 1 are always maintained through at least one set of locks 13. Only one set of locks 13 is retracted or inserted at any one time. Also, the clear separation gap between the monomers 1 is always maintained during the operation because the wedges 14 of one set of locks 13 are kept extended when the locks of the other set are being moved.

The wedges 14 of the locks 13 that are being moved are retracted. If the wedges 14 are not retracted, then the locks 13 cannot be moved unless all of them are moved simultaneously. If they were all moved, the effect would be to change the inter-monomer gap, which in general should not be allowed to happen. The computer or other controller should therefore ensure that the wedges 14 on any lock 13 are retracted before that lock is moved. There are, however, instances when moving the locks 13 with the wedges 14 engaged makes sense. For example, in the erection of semi-permanent structures, the monomers may be "parked" by reducing the inter-monomer gap to zero to clamp them together as rigidly as possible.

FIG. 15d shows one case of a face lock in which all four of the locks of the right monomer 1 are extended into the left monomer 1. To free the right monomer 1 for movement by the motor 24 of the left monomer 1, one pair of the locks 13 of the right monomer 1 is simply retracted.

FIG. 15e shows the other case of a face lock, in which all four of the locks 13 of the left monomer 1 extended into the right monomer 1. To free the right monomer 1 for movement the face lock is first converted into a complementary lock by withdrawing the pair of locks of the left monomer 1 that lies along the direction of intended movement and extending the corresponding pair of locks 13 of the right monomer 1. Then the remaining extended pair of locks of the left monomer 1 is withdrawn.

FIG. 15f shows the case of a complementary lock in which it is only necessary to withdraw the extended pair of locks 13 of the left monomer 1 in order to free the right monomer 1 for movement.

FIG. 15g shows the other case of a complementary lock. To free the right monomer 1 for movement in the desired direction, the complementary lock is first converted to a face lock, in which the right hand monomer 1 has all four of its locks 13 extended, by the left monomer 1 withdrawing its extended pair of locks 13, lying along the direction of the intended movement, and the right monomer 1 extending its corresponding pair. The right monomer 1 then withdraws the other of its pairs of locks 13, leaving engaged the pair of locks 13 along the axis of which it is desired to move the right monomer.

Monomers 1 once freed to move are moved by selectively activating the motors 24 on the fixed structural monomers 1. The power to these motors 24 need not all be switched on at the same time on a long track of adjacent monomers 1. The power can be switched on to the monomers 1 that are to transport another monomer 1 shortly before the moving monomer is due to arrive. Some time is allowed for each monomer 1 to speed up and slow down its traction motor 24.

While movement is affected through the use of gears 23 and the extensible locks 13 with toothed wedges 14, there is a mechanical problem in making sure that monomers 1 arrive at their destinations and stop accurately with all four locks 13 of a face properly aligned, a requirement if power and data connections are to be made and if structures are to be built with accuracy. These problems are caused by inertia of the moved monomer 1, inertia of the motor 24 and gear mechanisms, and by tolerances in the machining of the parts. A large part of the inertia problem can be solved by slowing down the monomers 1 as they approach their desired positions, but the remaining problem of machining tolerances is such that with this design of the monomers 1, some further means for ensuring accurate positioning of the monomers at the end of a movement may be required.

FIGS. 16a and 16b show one form of mechanical stopper mechanism, for one face of the cubic monomer 1, for locating a moving monomer 1 in position. The stopper mechanism comprises four spring studs 28 located in the major grooves 11, one near each edge of the face of the cube. Each of the four studs 28 is spring mounted on a common carrier 29. The carrier 29 is used to extend the studs 28 into the major groove 11 for use, and to retract them when they are not required. The carrier 29 is actuated by a solenoid or linear motor 30. The outward facing edges of the studs 28, those edges nearest the edges of the face of the cube, are chamfered. That and their spring mounting on the carrier 29 allows them to be depressed back into the body of the monomer 1 by the locks 13 of an advancing monomer. The inward facing edges are not chamfered and so the studs 28 act as a trap. The locks 13, which are the part of the advancing monomer 1 that contact the studs 28, should also have lightly chamfered edges to allow a smooth entry into the trap. As shown in FIG. 16, the studs 28 are biased into the extended position by a compression spring 32. This action can be assisted by reversing the action of the solenoid 30.

The design of the spring stud mechanism is such that the trap can be activated even after a travelling monomer 1 has partially entered the trap, which is desirable for a number of applications.

The trap works only in one axial direction at any one time because an advancing monomer 1 has only one pair of its locks 13 extended; nothing comes into contact with the studs of the other axis. Therefore all four sprung studs 28 can be connected to the same carrier 29 and solenoid 30.

Once the moving monomer is in position, the forces on the sprung stud mechanism are preferably minimised by immediately locking the two monomers together with either a complementary lock or face lock. Otherwise the sprung studs could become distorted and jam in their sockets.

The default action of the spring 32 on carrier 29 is to extend the studs 28. This action is desirable for stopping moving monomers 1 should sudden power failure occurs.

Referring now to FIGS. 17 and 18, a second form of cubic monomer 33 has on each face four symmetrically positioned grooves, each running parallel and fairly close to a respective edge of the face. Each groove comprises a slot 34 at 45° to the face of the cube, angled towards the centre of the cube, and a similar slot 41 angled away from the centre of the cube.

Like the first form of monomer described above, the second form of monomer uses two pairs of locks for each face of the cube 33. Each lock comprises a wedge 35 that can be extended out of and retracted into one of the slots 34 and, when extended, engages in the slot 41 of an adjacent monomer. The slots 34 and 41 are so positioned that they are aligned when two monomers are face-to-face with the correct spacing between them. Each pair of locks comprises the locks near opposite edges of a face of the monomer 33. The wedges 35 of each pair are linked by flexible rods 36 to a common linear actuator mechanism 37. As shown in FIG. 17, the linear actuator 37 comprises a motor 21, a screw shaft 22, and a ball-and-socket decoupling mechanism 40 similar to those shown in FIG. 6.

On locking, the flexible rods 36 are tightly sprung, and do not allow the wedges 35 to be pushed back into the slots 34. The ends of the wedges 35 have toothed racks 42. When inserted into another monomer 33, the teeth 42 on each wedge 35 engage a pinion gear 43 of the other monomer 33. Driving the gears 43 slides the monomer 33 with the extended wedges 35 along. An enlarged detail of the gear 43 and the toothed edge of the wedge 35 is shown in FIG. 17b.

FIG. 17b, being a cross section, shows only one pair-of wedges 35 of each monomer 33. As mentioned above there are two such pairs to any face. A diagrammatic representation of all four wedges 35 of a face, in the extended position, is shown in FIG. 17c.

As shown in FIG. 17b, the axes of the gears 43 are parallel to the associated face of the monomer 33, and the gears can be arranged in pairs on a common shaft, engaging the two wedges 35 of a pair. Each pair of slots 41 will be provided with a plurality of such pairs of gears 43, which are preferably driven from a common motor by a system of gears wheels and/or drive belts. If a corresponding change to the teeth 42 of the wedges 35 is made, the axis of the gears 43 can be turned 90° as shown in FIG. 17d. All of the gears 43 for a face of a monomer 33 then have parallel axes and can be driven from a single motor by a common toothed belt.

The traction mechanism of the second form of monomer 33 is therefore similar to that of the first form of monomer 1, and the methods explained above, with reference to FIG. 14 and 15, for converting between the face lock, the complementary lock and sliding configurations are the same as for the monomers 1. The monomers 33 also employ a stopper mechanism. The monomers 33 have similar electrical means 15 mounted on the wedges 35 or on the face of monomer 33 in methods similar to monomer 1 to pass power and data and preserve the four fold rotational symmetry of the face.

FIGS. 18a and 18b both show two engaged monomers 33. FIG. 18a shows a single pair of wedges 35 extended from the left monomer 33 into the right in a sliding configuration. Activating the gears 43 of the appropriate face of the right monomer 33 would move the left monomer 33 into or out of the plane of the paper. FIG. 18b shows the pairs of wedges 35 of the left monomer 33 extended into the right monomer 33 in a face lock.

An advantage of the monomers 33 over the monomers 1 is that they require no equivalent to the wedges 14 of the locks 13 of the monomers 1. Once a pair of wedges 35 of one monomer 33 is inserted into another monomer 33, the 90° angle between the wedges 35 automatically ensures that the monomers 33 cannot be separated. There is no need for any further member to be extended from the wedges 35.

The monomers 33 have a number of other advantages over the monomers 1. They are simpler to implement. Their wedge locking mechanism occupies less depth in its monomer. Their wedges 35 are much thinner than the locks 13 of the monomers 1, saving material and machining costs. Their wedges 35 are lighter in weight and travel through a shorter distance, resulting in a quicker locking mechanism. The monomers 33 are cheaper than the monomers 1 to machine and construct. The single groove mechanism is mechanically less sound in design with features that lead to greater stress concentration and consequent breakage and/or lead to a mechanism that is more prone to mechanical jamming than the double slot mechanism. One such feature is that the locks 13 are narrow when compared to the distance between a pair of wedges 35 which is almost the full width of a monomer 33.

Referring to FIGS. 19 to 22, the third form of monomer 44, like the first form, has a single major groove 47 in each direction across each face. The monomer 44, however, has a hinged lock mechanism, which in some respects is simpler to construct and implement than either of the locks described above. FIG. 19 shows a partly complete monomer 44 employing the hinged lock mechanism. The monomer has a cubic base unit 45 with a face unit 46 mounted on each of the six faces of the base unit. The grooves 47 are formed in the outer faces 54 of the face units 46. Each groove 47 is T-shaped in cross section. FIG. 20 shows how two opposing face units 46 of different monomers 44 lock together. At the bottom of each of the four arms of the cross shape formed by the grooves 47 there is provided a pair of locks 48 which are hinged to pivot about axes parallel to the length of the groove 47. These locks can pivot between two positions. In the disengaged position they lie flat along the bottom of the groove 47. To reach the engaged position they are pivoted through 90°. In that position they extend into the groove 47 of an opposing face unit 46. Each lock 48 is provided with two grooves 49 and 51, extending parallel to the length of the groove 47. The first groove 49, further from the pivot axis, engages one of the two lips 50 provided by T-shape of the groove of an opposing face unit 46. The locks 48 of a pair engage respective ones of the two lips 50. The second groove 51 receives the corresponding lip 50 of each lock's own face unit, allowing the lock to reach its engaged position.

To facilitate relative motion of two monomers 44, each lock 48 is provided at its extremity with a rack 52 for engaging pinion gears 53 mounted in the groove 47 of an opposing face unit 46. The gears 53 are mounted to rotate about axes normal to the outer face 54 of the face unit 46.

The considerations of which locks to engage and disengage are similar to those for the monomers 1 and 33 except that the locks are not moved in pairs but fours consisting of all the locks located within the two opposite arms of one of the grooves 47 of a face unit 46, that is all the locks 48 along one of the two axes of movement of the monomers 33.

FIGS. 21 and 22 are cross sections, like FIG. 20, of a face unit of a monomer 44, which show only half of a face unit.

FIG. 21 shows an alternative design of the hinged lock mechanism which differs from FIG. 20 in that each of the locks 48 has at its extremity a transverse projection 60 instead of the groove 49. This projection locks a monomer to its neighbour by engaging a slot 61 in the wall of the groove 47 of the neighbour.

FIG. 22 includes additional construction lines 62 and 65 to show the clearance space 64 that is needed to allow the lock to swing into the groove 49. This clearance space can be minimised (for example by making the transverse projection 60 and the slot 61 follow the arc of the curve 65) to avoid mechanical vibrations. Similar to rack 52 in FIG. 20, there is a rack 52 on the tip of the transverse projection 60. The rack 52 engages pinion gear 63 (not shown in FIG. 22) as before.

Instead of a mechanical mechanism for interlocking monomers to effect the relative motion of and securing of monomers, three different designs of which have been discussed above, it is possible to provide monomers that have smooth faces and are moved and secured relative to each other by means of electromagnets buried within the monomers.

Transport of monomers is provided by linear motors, which comprise electromagnets. The linear motors of stationary monomers levitate the monomers that are to be transported. With careful co-ordination of the linear motors of a row of stationary monomers, a high speed of transport along the row could be achieved.

Linear motors of conventional design would not allow monomers to be transported vertically up the sides of stationary monomers nor along their undersides, but that could be effected by provision of attractive as well as repulsive windings in the linear motors.

Magnetically interacting monomers, unlike the monomers with mechanical locks, would not be limited to motion in directions along rows of monomers. With suitable phasing of the excitation of the electromagnets a monomer could be made to travel diagonally across a sheet of monomers.

Accuracy of motion could in principle be achieved by careful co-ordination of the windings of the monomers. Feedback for control of the motion of monomers, to see, for example, when a monomer has reached its destination, is provided by optical sensors mounted in their surfaces. Preferably, velocity as well as position sensors are provided. Ideally the windings would be arranged so as to tend to move the monomers back towards its ideal position or path automatically, without the need for feedback, when it departs from that position or path.

When monomers first arrive in position they can be held in place by electromagnets. That method would however, limit the strength of any structure formed from the monomers and would be wasteful of the power required for the electromagnets. Mechanical locks could be provided to take over from the electromagnets or braces 55 as shown in FIG. 23 could be employed. The braces 55 are transported by means of the linear motors and are engaged mechanically onto the electromagnetic monomers 56.

FIG. 23 also illustrates a method of strengthening a wall 57 built from the monomers 56. The wall 57 has the horizontal rows of each vertical plane of monomers making up the wall staggered for the same reasons that ordinary bricks are. The parallel can be continued by providing special shaped monomers, such as ones of half length and/or ones of one and a half length to fill gaps.

Electrical connection for power and data between the monomers 56 is provided by a number of contacts on the surface of the monomers. The contacts are selectively utilised depending on their registration with the contacts of a neighbouring monomer.

These electromagnetic monomers 56 can be used to build frictionless machines in which parts composed of the monomers are moved without touching relative to each other under the influence of the electromagnets. The power required is likely to be high.

The weight of the electromagnetic monomers is of importance in their design. Much of the weight of electromagnets is in their cores. Therefore recent advances leading to the development of coreless stepper motors, which are very much like linear motors, will be applicable to the electromagnetic monomers.

In order to form machines and structures from monomers, it is necessary for the monomers to transport each other around in a coordinated manner so that monomers end up in their desired position. That requires the transmission of data between monomers. It is also desirable that power, usually electrical power, is distributed to a monomer, from some central source, via its neighbours. That avoids the disadvantages of weight, finite length of operation, and cost that batteries would have. Below will be discussed connections between monomers for transferring power and data between them and also means for directing data and power received by a monomer at one of its faces to one or more of its other faces. These will be generally applicable to all the types of monomer discussed above.

FIG. 24 shows a two dimensional representation of a cubic monomer 70 as a hexagon where the sides 71 of the hexagon correspond to the faces of the monomer. Shown in the Figure is one form of the connections between the faces in the case where the monomers are under the control of a single external computer. Each face is connected to a power bus 72, a routing bus 73, a data bus 74 and a synchronisation bus 75 via switches 76 which may be relays or semiconductor devices. Some of these busses comprise more than one conductor in parallel. The switches for connecting a particular bus to a particular face can be can be operated independently. Signals and power carried on the busses are transmitted between the faces of neighbouring monomers via contacts on their locks, or in the case of the electromagnetic monomers 56 via contacts on their surface. The switches are provided to enable contact between two monomers to be broken even when contact between neighbouring faces is made.

The power bus 72 is provided to distribute power to the monomers from some external source. In general it is not necessary for the connection of the power bus 72 between neighbouring monomers to be broken by use of the switches except, to prevent arcing, when the physical connection is about to be broken by withdrawing a lock. In the electromagnetic monomers it is convenient for the power bus 72 to comprise several lines each carrying a different phase of alternating current for the various electromagnets making up the linear motors.

The routing 73, data 74, and synchronisation 75 busses are preferably buffered for some purposes and switches are provided to connect, when desired, the necessary amplifiers into the lines of the busses. Either the lines of the busses are bidirectional or there are provided input and an output version of each line at each face.

If lines are bi-directional then the common bus scheme of FIG. 24 has to be modified. For each line, switches are provided to divide each line into segments and an amplifier is provided. The switches are operated to connect the desired input face to the input of the amplifier and to connect the output of the amplifier to the desired output faces.

If separate input and output lines are provided then there is no need to divide the lines. Buffering is provided for each input and output line pair simply by connecting an amplifier between the input line and the output line.

The routing 73 and data 74 busses have related functions. The routing bus 73 carries signals instructing the monomers to operated their switches so as to connect particular monomers to the external computer via the data bus 74. It is usual for all stationary monomers to be connected to the external computer via the routing bus so that the desired data bus connections can be established quickly. In the case where some or all the monomers have controlling computers, the routing bus is used to establish connections between monomers. The routing bus also carries information relating to which monomer or monomers should transmit and receive over the data bus.

The data transfer over the data bus 74 includes, for example, instructions for monomers to operate their locks and traction motors, messages that monomers have reached their desired positions, and messages that a monomer has become faulty. To ensure compatibility between monomers made by different manufacturers, it is desirable for all monomers to obey the same protocol for reading and writing to the routing bus 73. A greater degree of flexibility is possible with the data bus 74 and this is desirable in that specialised monomers or ordinary monomers performing different functions may need to send different sorts of data and to send data at different speeds. The routing bus 73 is therefore also used to transfer signals to the monomers instructing them as to which protocol to use for the data bus 74. Any given monomer need only be provided with hardware for reading and writing to the data bus according to the protocols useful to it.

The synchronisation bus 75 is used to ensure that monomers carry out physical actions in a synchronised manner. For example, a group of monomers may be instructed to perform an action, for example, to start their motors to move a group of monomer that are locked together. They then all start their motors together on receipt of a signal on the synchronisation bus 75. The routing bus 74 is used to send signals that determine which. monomers receive a particular signal on the synchronisation bus. The routing bus is also used to send information to monomers as to which monomers should react to the synchronisation signal on the synchronisation bus.

The configuration bus architecture described here is preferred to packet switching for transferring data between monomers because with packet switching it is not certain when data will arrive at its destination, making it difficult to know when to issue synchronisation signals, and also because packet switching would require the provision in the monomers of much logic to control the transfer of packets and to store them for forwarding.

The contacts on the locks of the monomers, or on the surfaces of the electromagnetic monomers, are so arranged that when a monomer is locked in position each contact is in contact with a corresponding contact of its neighbouring monomer. For cubic monomers, where many of the lines of the busses are in input and output pairs there is a particularly convenient arrangement for the contacts. For each face of the cubic monomer, four contacts for each line are placed in positions preserving the four-fold rotational symmetry perpendicular to the face. Unpaired contacts are placed either on the diagonal or on the orthogonal centre lines of the face. For the paired contacts, the contacts of a pair are placed symmetrically to either side of the orthogonal lines or to either side of the diagonal lines. In this arrangement, each unpaired line of a monomer is brought into contact with the same line of a neighbouring monomer and each input line of a monomer is brought into contact with the corresponding output line of its neighbour and vice versa. Thus the monomers can be added to the material in any orientation, obviating the need to know which way up and round any monomer is. Such as arrangement for the monomers 1 is shown in FIG. 25 which shows one face of the monomer in plan. The contacts, as mentioned earlier, are positioned on the locks 13. On the centre lines 80 are placed the power contacts 81 and the synchronisation contact 82, and to either side of these are the data bus in 83 and out 84 contacts and the routing bus in 85 and out 86 contacts.

As mentioned earlier, to build structures from and to operate machines built from monomers they have to be supplied with control signals. While in principle an operator with a suitable generator could issue instructions one at a time for particular monomers to operate their locks and to be moved one monomer along, up or down, this is an extremely tedious way to proceed. With a suitably programmed computer, the operator would ideally need only to specify the configuration of a structure or the various configurations of a machine and the computer would work out all the movements of monomers necessary and would issue all the required instructions to the monomers to operate their movement motors and their locks.

A more achievable solution between those two is for the operator to analyse the construction of a structure into some fairly general operations; a suitably programmed computer is then used to convert these operations into the individual instructions to the monomers. Some examples of general operations are discussed below.

Figure 26A:
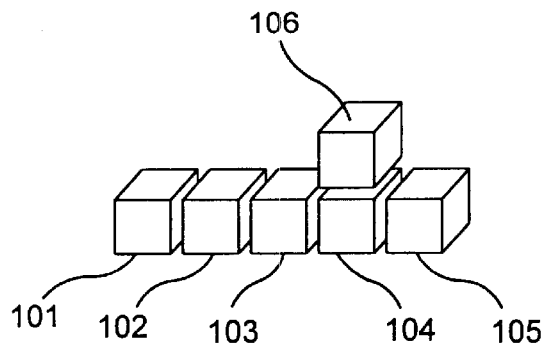
Figure 26B:
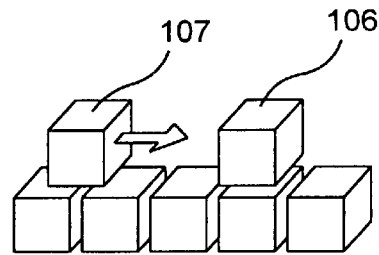
Figure 26C:
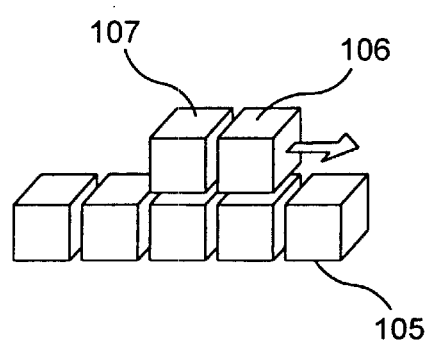
Figure 26D:
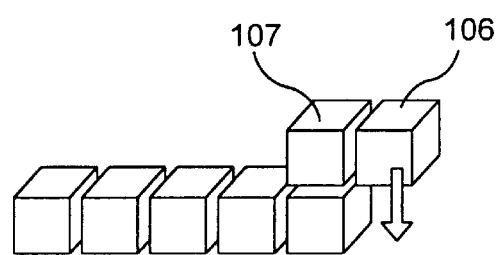
Figure 26E:
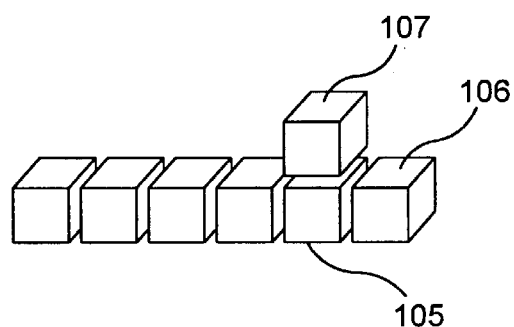

The normal and L-type streamers shown in FIG. 3 are examples of general operations and they will now be discussed in detail. FIGS. 26*a–e* show stages in the growth of an L-type streamer 8. FIG. 26*a* shows the streamer after some growth has taken place. Five monomers 101, 102, 103, 104 and 105 are arranged in a row with 105 being the tip of the streamer 8. A monomer 106 is above monomer 104. FIG. 24*b* shows another monomer 107 advancing along the top of monomers 101, 102, 103. On reaching monomer 103, monomer 107 engages monomer 106 (see FIG. 26*c*). Monomers 107 and 106 are then advanced as a pair until monomer 107 is above monomer 105, in which position (see FIG. 26*d*) monomer 106 projects beyond the tip of the streamer 8, monomer 105. Monomer 106 is then lowered from monomer 107 to the position in front of monomer 105 to become the new tip of the streamer 8 (see FIG. 26*e*). The configuration of the monomers is now similar to that of FIG. 26*a* except that the streamer is now one monomer longer. For the streamer to grow further, the cycle of operations shown in FIGS. 26*a–e* is repeated. It is a simple matter to program a computer to issue instructions to the monomers so as to grow a streamer. All the operator needs to do is to specify how long it should be. While the direction of growth of the streamer shown in FIGS. 26*a–e* is to the right, similar methods could be used to extend streamers in any of the orthogonal directions.

FIGS. 27*a–e* show stages in the growth of a streamer 8 which is similar to that of FIGS. 26*a–e* except that each monomer in FIGS. 26*a–e* is replaced by a block of 2×2×2 monomers. These blocks are moved in the same way as are the single monomers of FIGS. 26*a–e*.

FIGS. 28*a–d* show stages in the growth of a streamer 8 in which some of the units corresponding to the single monomers of FIGS. 26*a–e* are 2×2×2 blocks of monomers and some are large monomers 110 equal in size to the 2×2×2 blocks.

These large monomers 110 are not simply the standard monomers scaled up but have the same sized locks repeated at positions over their faces appropriate for interacting with the standard monomers. The large monomers 110 may additionally employ larger scaled up locks 13 for interacting with similar monomers 110. The larger locks 13 are for greater strength and to allow higher power motors 24 to move monomers 110 at higher speeds.

In the examples of streamers described above, the streamers have been narrow, which is not always the case. Wall and sheets of monomers can be grown using a streamer method using a unit which is many monomers in breadth. Alternatively, walls and sheets can be made by growing independently a number of adjacent parallel streamers.

Figure 29A:
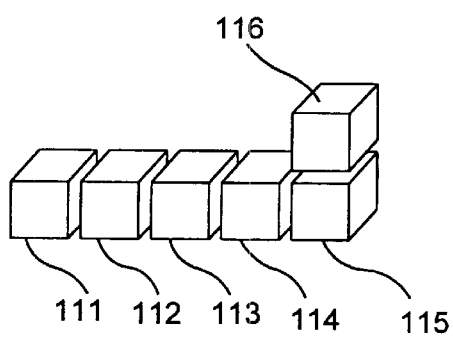
Figure 29B:
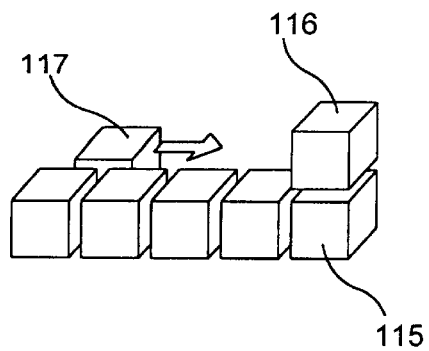
Figure 29C:
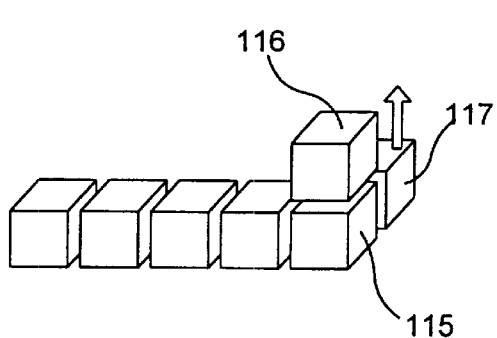
Figure 29D:
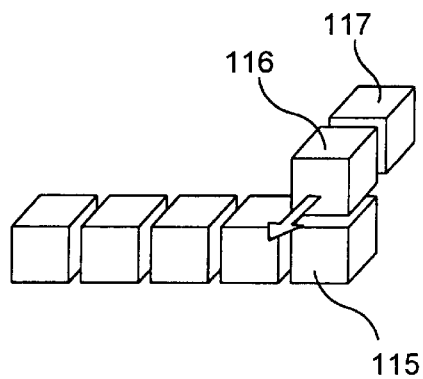
Figure 29E:
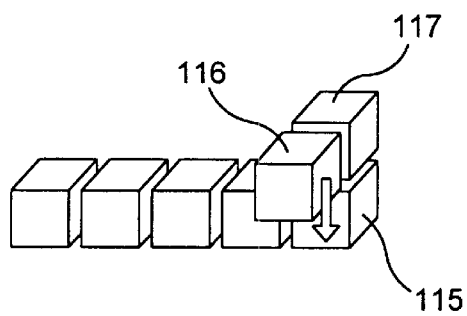
Figure 29F:
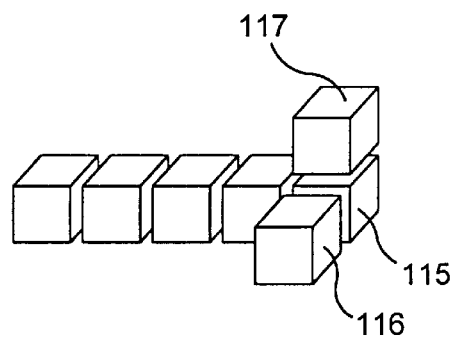

FIGS. 29*a–f* shows a method by which a streamer can be made to turn a corner. In FIG. 29*a* there is a monomer 116 on top of the tip monomer 115 of a streamer 111, 112, 113, 114, 115. A new tip to the left of monomer 115 can be provided by advancing a monomer 117 along the left side of the streamer as is shown in FIGS. 29*b* and *c*. If however, it is wished to have the new tip on the right side of the streamer but it is difficult to advance a monomer up that side, the configuration of FIG. 29*c* can be manipulated to provide a new tip on the right side (see FIGS. 29*c–f*). Firstly the monomer 107 is moved up from monomer 115 to monomer 116. Next monomers 116 and 117 are moved as a pair so that monomer 117 moves to the position above monomer 115. Then monomer 116 is moved down from monomer 117 to become the new tip to the right of monomer 115. Monomers to extend the streamer further can then be advanced along the top of the streamer, pausing at monomer 115 to change direction by 90°.

The methods of turning a corner shown in FIGS. 29*a–f* can be applied to 2×2×2 blocks of monomers. An alternative method is shown in FIGS. 30*a–i*. Firstly a 2×2×2 block is advanced to the position above the tip. Next that 2×2×2 block is moved one monomer, half its width, across to one side (FIG. 30a) and then the four monomers projecting over the side of the streamer tip are moved together down one monomer (FIG. 30b). The uppermost two monomers are moved together across to be on top of those four monomers (FIG. 30c). The resulting wall of six monomers is moved down one monomer (FIG. 30d). The uppermost monomers are now a 2×2 sheet which is moved across one monomer so that two of those monomers project (FIG. 30e). The projecting two monomers are then moved down one monomer (FIG. 30f) and the other two monomers of what was the 2×2 sheet are moved across one monomer to be on top of them (FIG. 30g). Finally those four monomers, now a 2×2 wall, are moved down one monomer (FIG. 30h). The resulting configuration has a 2×2×2 block of monomers to one side of the old tip of the streamer (FIG. 30i).

The growth of the normal streamer was explained earlier and it will be clear that, like the L-type streamer, the process can be applied to blocks of monomers and mixtures of monomers of different sizes.

The streamer methods are reversible in that reversing their steps results in the streamers being retracted.

Both of the methods above-described of extending streamers require a supply of single monomers or other units at the base of the streamer. Clearly the units need to be supplied from somewhere. A collection of monomers that are free to be supplied and are grouped together in one place will be called a reservoir. A reservoir method is one for supplying monomers from a reservoir to a particular position on its boundary which will be called its gateway. That term can also be applied to the position to which monomers must be supplied for the growth of a streamer.

Generally the gateway of a reservoir will be distant from the gateway of a streamer. The gateways can be linked by collections of monomers which will be called highways because usually they have the form of a narrow strip of units. Highways can easily be constructed by using streamers. Once a highway has been built, units can be transported along the highway from one gateway to another.

A method of constructing a structure from a programmable material, starting with a reservoir of units is as follows: first a highway is built from the gateway of the reservoir to the gateway of the proposed site for the structure, then monomers are delivered from the reservoir to the site, where they are used to construct the structure. The exact method used to construct the structure will depend on its form but most structures can be analysed into sheets, walls and elongate members all of which can be formed by using streamers. As the construction of a structure progresses the points at which monomers need to be delivered can be distant from the gateway to a site. In such cases, part of the structure can be designated as highways for transporting monomers from the site gateway to where they are needed.

Some further consideration to be taken into account are that throughout construction, the structure has to remain mechanically stable and that it may not always be possible to supply the monomers fast enough during some periods. A solution to that problem is to provide reservoirs inside the construction site, which can take up monomers during times when demand is not so great.

Another method to consider using in the construction of a structure is to assemble part of it somewhere else before moving it to its final position. Consider for example the tower 120 of FIG. 31, which comprises two decks 121 supported by a pillar 122 at each corner. The decks are 4×4 squares, or cross shapes if the corner monomers are counted as part of the pillars. This structure could be constructed by first raising the four pillars 122 and then bridging between them to form the two decks 121. Because the pillars are many monomers high and not absolutely rigid, they will in practice not be an exact number of monomers apart at the top. That makes the bridging difficult to achieve since monomers attached to one pillar must engage precisely with monomers of another pillar.

A better method is to first assemble on the ground a block of monomers 4×4 in plan and 2 monomers high to form the two decks stacked on top of each other and the bottom two monomers of each tower, and then to raise the four pillars at the corners of the block. Finally to finish the tower 120 it is only necessary to raise the cross shaped decks to the required heights. As the decks are raised they constrain the towers to being exactly two monomers apart.

When constructing large structures, it is useful to build the deeper structural components first and then add the surface details later. The deeper structural components can be switched off once they are in position leaving only the actively deforming skin layer powered up saving considerable energy.

Some structures will require vast numbers of monomers. It is to be expected that from time to time a monomer will fail. Such a monomer could be locked into the structure at some unimportant point. Ideally it should, however, be removed from the structure and be deposited in a special reservoir or dump where it can cause no further problems. Monomers that are still functioning can be used to move faulty monomers and replace it with functioning monomers from another reservoir thus accomplishing a self repairing task.

The self repair method can be extended to where many monomers fail simultaneously in a well defined cluster. Monomers unaffected by damage but neighbouring the damaged cluster are used to move the damaged cluster as before and replace them with functioning monomers. Where damaged clusters may not need to be repaired and abandonment is more important, damaged clusters are ejected by functional monomers neighbouring the damaged cluster by withdrawing their locks 13 from the damaged cluster.

The method discussed above of analysing an amount of programmable material into objects such as streamers, highways, and reservoirs which have boundaries between them breached at a limited number of gateways, lends itself to the case where many or all of the control signals needed to operate the material are generated by computers inside some or all of the monomers. The computer or computers of each object need only concern themselves with the functions of that object while from time to time overseeing the transfer of monomers via gateways to and from neighbouring objects. For example a highway could be instructed to move all monomers received at one gateway to another gateway, which task it could proceed with without further external instruction.

The analysis of a machine made of monomers into parts comprising several monomers is a useful first step in working out how to achieve the desired movements of the machine. The walker 6 of FIG. 2 is an example of a simple machine. The parts it comprises are a body 130 which is two monomers high, one wide and many in length, and six legs 131 each three monomers high. In their usual positions, the legs are joined at their top monomer to the lower row of the body. The walker 6 can be moved by moving the legs one at a time forward along the body and then sliding the body forward through the legs. The legs are moved by first raising them up one monomer, then moving them along, and then moving them down one monomer.

The monomers described above will not by themselves be able to provide every type of machine. However, by providing specialised parts mounted on monomers, their utility can be greatly enhanced. As an example of this, a lathe could be built from standard monomers along with a monomer with a cutting tool mounted on it and another monomer with a rotatable chuck mounted on it. The standard monomers are used to provide the frame of the lathe and a mechanism for advancing the cutting tool into the workpiece.

There can be many specialised monomers that do particular specialised tasks very well. A few described below greatly enhance usefulness in general applications. One such monomer is an adjustable foot unit. An adjustable tipped rod extended from a specialised monomer acts as a foot unit which can be used to level structures that are erected. The walking mechanism described earlier would benefit from such a foot unit attached to legs 131 on an uneven surface.

Another specialised monomer is one with a wheel which may be power assisted, steerable and have brakes. Several such wheeled units could support a structure which can then be made mobile on a reasonably flat surface. Such a machine would be expected to travel faster than a walking machine.

Yet another specialised monomer is one which is substantially air tight and posses an air cavity so as to bear much more weight that itself in a liquid medium. A collection of such monomers allows a structure to be supported above it in a liquid medium such as water or oil.

The three specialised monomers described above substantially increase the multi-terrain capability of monomers. That is, monomers can then negotiate rough ground, level ground and water which a typical requirement for a multi-terrain vehicle. Where rough ground includes obstacles, programmable materials simply deform around the object through the use of streamers, highways, reservoirs and gateways. Computers with software for terrain negotiation and sensors for obstacle detection are needed to perfect such machines.

Another useful specialised monomer is one which allows rotation, free or powered, of opposite ones of its faces about the axis through their centres. This allows machines in which parts built of monomers rotate relative to each other. Two such monomers can be used to support long objects, one monomer supporting each end, along tortuous highways.

Of the myriad possible uses of programmable materials two more are mentioned by way of example. Because of their flexibility, programmable materials are useful in disaster situations with hostile environments. For example, in a damaged nuclear power station programmable material could be used to erect, without the need for people to enter damaged area, strongly radiation-blocking walls to a required shape and thickness. In such a situation the monomers would be parked to eliminate the gaps that they usually have between them.

Again because of their flexibility, programmable materials would also be useful in military engineering, for example, in the construction of temporary bridges. Such bridges could be programmed to be self repairing after being damaged.

What is claimed is:

1. A method of reconfiguring an assembly which comprises a plurality of machines, each of the plurality of machines being of substantially parallelepiped form and including interacting parts on a face of the machine that are capable of interacting with corresponding parts on faces of others of the plurality of machines, the method including the steps of:

causing a first machine of the plurality of machines to slide relative to a second machine and relative to a third machine of the plurality of machines, through interaction of parts on a confronting face of the first machine with parts on confronting faces of the second and third machines, from a first position in which said confronting face of the first machine is immediately adjacent to and confronts said confronting face of the second machine to a second position in which said confronting face of the first machine is immediately adjacent to and confronts said confronting face of the third machine but no longer is immediately adjacent to and no longer confronts said confronting face of the second machine, and securing the first machine to the third machine through interaction of said parts on the confronting faces of the first and third machines.

2. A method of reconfiguring an assembly which comprises a plurality of machines, each of the plurality of machines being substantially the same cuboidal shape and of substantially the same structure, the machines being disposed in an array in which each machine is adjacent to another machine with the adjacent faces of the adjacent machines aligned with and confronting one another, the method including the step of causing a first machine that is in a first fixed position adjacent to a second machine but not adjacent to a third machine to move from the first fixed position to a second fixed position in which the first machine is adjacent to the third machine but not longer adjacent to the second machine, the movement of the first machine being caused by interaction of parts connected to the machines and the first machine remaining connected to the second or third machine throughout its movement.

3. A method of moving a first machine of substantially parallelepiped shape from a first site immediately adjacent to a face of a second machine of substantially parallelepiped shape to a second machine of substantially parallelepiped shape to a second site immediately adjacent to a face of a third machine of substantially parallelepiped shape, the machines having interacting parts that interact with one another to cause relative sliding transport of the first machine relative to the second and third machines, the interacting parts also being selectively operable to secure the first machine in a fixed position at the first site and at the second site.

4. A method according to claim 3, which relies for stopping movement substantially on the feature that said machines comprise a plurality of studs on a face of the machine engageable with interlocking mechanical parts or features of a neighboring identical machine so as to locate it in position, the studs being depressible by a said identical machine that is advancing to become such a neighboring machine and retractable so as to release the neighboring machine.

5. A method according to claim 3, wherein the first machine has neighbors that are secured to it and that move with it.

6. The method according to claim 3, where a machine moves along a row of machines repeatedly applying said method.

7. A method according to claim 3, wherein the motion of the machine along the row is continuous.

8. A method according to claim 3 of extending by one unit a streamer of units in a row ending in a tip unit, each said unit being a said machine, the method comprising moving a pair of units along the streamer until one of the pair is a neighbor of the tip unit and the other extends beyond the tip unit, and moving the other unit of the pair from being a neighbor of the one unit to being the neighbor of the tip unit, in which position it becomes the new tip unit, the movement of the machines being according to said method.

9. A method according to claim 3 of extending by one unit a streamer of units in a row beginning in a base unit, each said unit being a said machine, the base unit having one or more neighboring said machines that are not in the row, the method comprising adding an extra unit to the row before the base unit and advancing the row relative to the one or more machines neighboring the base unit by said method according to claim 3 a distance of one unit in the direction that results in the extra unit moving to the original site of the base unit.

10. A machine of substantially parallelepiped shape, having means for so interacting with identical machines as to cause relative movement of them and the machine, wherein it comprises means arranged so to interact with identical machines as to cause relative transport of them and the machine over a face of the parallelepiped, while permitting movement only substantially parallel to that face, and means arranged so to interact with identical machines as to secure the machine in position relative to them.

* * * * *